United States Patent
de Jong

(10) Patent No.: US 10,196,123 B2
(45) Date of Patent: Feb. 5, 2019

(54) SYSTEMS AND METHODS INCLUDING ELEVATION CONTROL

(71) Applicant: THIN RED LINE AEROSPACE LTD, Chilliwack, British Columbia OT (CA)

(72) Inventor: Maxim de Jong, Chilliwack (CA)

(73) Assignee: THIN RED LINE AEROSPACE LTD, Chilliwack, British Columbia (CA)

(*) Notice: Subject to any disclaimer, the term of this patent is extended or adjusted under 35 U.S.C. 154(b) by 211 days.

(21) Appl. No.: 15/412,005

(22) Filed: Jan. 21, 2017

(65) Prior Publication Data

US 2017/0129579 A1     May 11, 2017

Related U.S. Application Data

(60) Provisional application No. 62/286,277, filed on Jan. 22, 2016.

(51) Int. Cl.
| | |
|---|---|
| B64B 1/44 | (2006.01) |
| B64B 1/62 | (2006.01) |
| B64B 1/70 | (2006.01) |

(52) U.S. Cl.
CPC .............. B64B 1/62 (2013.01); B64B 1/44 (2013.01); B64B 1/70 (2013.01)

(58) Field of Classification Search
CPC .... B64B 1/62; B64B 1/44; B64B 1/70; B64B 1/04
See application file for complete search history.

(56) References Cited

U.S. PATENT DOCUMENTS

| | | | | |
|---|---|---|---|---|
| 2,094,619 A | * | 10/1937 | Reichert | ............... B64B 1/62 244/128 |
| 3,260,480 A | * | 7/1966 | Ash | ............... B64B 1/62 244/31 |
| 3,446,457 A | | 5/1969 | Struble | |
| 4,032,086 A | | 6/1977 | Cooke | |
| 4,215,834 A | | 8/1980 | Dunlap | |

(Continued)

FOREIGN PATENT DOCUMENTS

| | | |
|---|---|---|
| CN | 104859834 A | 8/2015 |
| DE | 10241567 A1 | 3/2004 |

(Continued)

OTHER PUBLICATIONS

International Search Report, PCT/IB2017/000108, dated Jun. 15, 2017.

(Continued)

*Primary Examiner* — Brian M O'Hara
(74) *Attorney, Agent, or Firm* — Nadesan Beck P.C.; David A. Jones

(57) ABSTRACT

A system for elevation control. The system comprises a substantially gastight envelope containing lifting gas wherein the envelope further comprises a plurality of envelope segments in fluid communication with one another. At least one tension cable connects at least two of the envelope segments. A control device including a motor adjusts the length of the tension cable to change the pressure within the envelope to thereby facilitate ascent and descent of the system. The control device causes the system to operate in ascent, descent, or vertically stationary modes.

133 Claims, 17 Drawing Sheets

(56) References Cited

U.S. PATENT DOCUMENTS

| | | | |
|---|---|---|---|
| 6,189,829 B1 * | 2/2001 | Brotz | B64B 1/70 244/24 |
| 7,150,430 B2 | 12/2006 | Silansky | |
| 9,016,634 B1 | 4/2015 | Ratner | |
| 2002/0179771 A1 | 12/2002 | Senepart | |
| 2014/0054421 A1 | 2/2014 | Bernard | |

FOREIGN PATENT DOCUMENTS

| | | | |
|---|---|---|---|
| EP | 0401891 A1 * | 12/1990 | B64B 1/44 |
| WO | 2017125820 A1 | 7/2017 | |

OTHER PUBLICATIONS

Written Opinion of the International Search Authority, PCT/IB2017/000108, dated Jun. 15, 2017.
CA Patent Application 02979320—Oct. 19, 2017—R30(2) Examiner Requisition.
CA Patent Application 02979320—Jan. 19, 2018—Amendment.
CA Patent Application 02979320—Jan. 19, 2018—Claims.
CA Patent Application 02979320—Feb. 14, 2018—R30(2) Examiner Requisition.
CA Patent Application 02979320—May 9, 2018—Amendment.
CA Patent Application 02979320—May 9, 2018—Claims.
CA Patent Application 02979320—CIPO Notice of Allowance dated Jun. 1, 2018.

* cited by examiner

| Elevation | Compression |
|---|---|
| Elevation Parameter 1 | Compression Parameter 1 |
| Elevation Parameter 2 | Compression Parameter 2 |
| Elevation Parameter 3 | Compression Parameter 3 |
| Elevation Parameter N | Compression Parameter N |

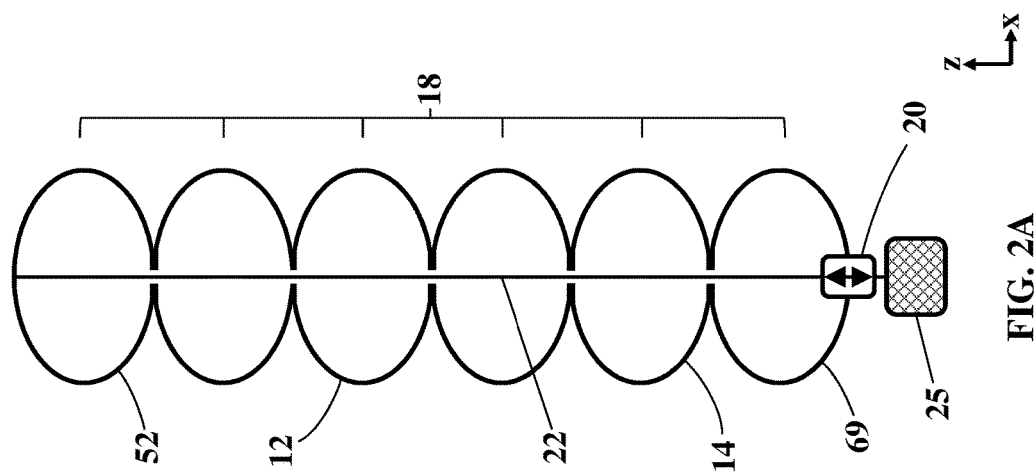
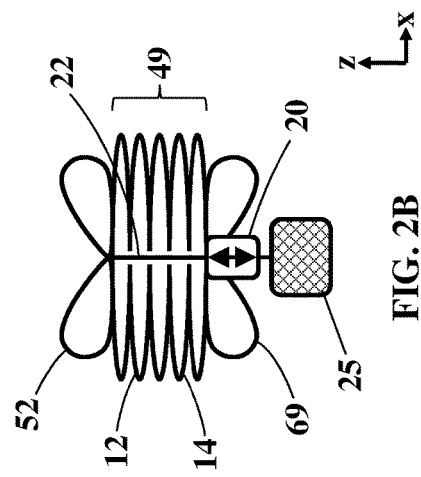
FIG. 2A
FIG. 2B

SYSTEMS AND METHODS INCLUDING ELEVATION CONTROL

CROSS-REFERENCE TO RELATED PATENT DOCUMENTS

This application claims the benefit of and priority to U.S. Provisional Patent Application 62/286,277 entitled SYSTEMS AND METHODS FOR ELEVATION CONTROL filed Jan. 22, 2016 and having the common inventor de Jong, the contents of which are hereby incorporated by reference herein. This document is also related to US Patent entitled FLEXIBLE VESSEL, issued May 29, 2012, U.S. Pat. No. 8,186,625, having the common inventor de Jong, the contents of which are hereby incorporated by reference herein.

FIELD OF THE INVENTION

The present invention relates generally to buoyant craft, such as balloons, and more specifically to a systems and methods for controlling such craft. Additional methods of manufacturing the systems, and components thereof, are described.

BACKGROUND

Significant economic and science benefit can be derived from persistent operation of a buoyant craft, whether in an atmospheric environment or submerged in a liquid environment. This benefit is immensely augmented if the craft presents the capability of active mobility through control of its ascent and descent. Besides altitude and depth control, otherwise referred to as elevation control, such mobility also facilitates controlled lateral mobility by taking advantage of favorable winds or currents at different elevations.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Systems and methods for elevation control are provided. The system comprises a substantially gastight envelope containing lifting gas, whereby the envelope further comprises a plurality of envelope segments in fluid communication with one another, and at least one tension cable connecting at least two of the envelope segments, and a device to adjust the length of the a tension cable to thereby change the pressure within the envelope, and a control element to cause the system to operate in ascent, descent, or vertically stationary modes.

A buoyancy control device can include a motorized cable system that tensions the envelope to compress or decompress the lifting gas within the envelope in order to change the density of the lifting gas thereby causing elevational movement of the system. The envelope of the system can furthermore adapt its pressurized volume to permit system mobility throughout great variation in elevational density of the ambient environment. The buoyancy control device can also include a processor and controller that actively monitor and control various components of the system. The buoyancy control device can further include a communications system for sending and receiving information and data with various remote devices. Examples of a remote device can be a communications hub, network other elevation systems, as well as direct communications with a ground center. The buoyancy control device can access, execute, and store data to recordable media.

A system including direct compression buoyancy control includes a substantially gas-tight envelope including a plurality of envelope segments in fluid communication with one another. The system includes lifting gas contained within the substantially gas-tight envelope. The system includes a tension cable connecting at least two of the envelope segments. The system further includes a buoyancy control device adjusting the tension cable thereby altering compression of the lifting gas within the substantially gastight envelope to control the buoyancy of the system.

The features and advantages of the invention may be realized and obtained by means of the instruments and combinations particularly pointed out in the appended claims. Additional features and advantages of the invention will be set forth in the description which follows, and in part will be obvious from the description, or may be learned by the practice of the invention. These and other features of the present invention will become more fully apparent from the following description and appended claims, or may be learned by the practice of the invention as set forth hereinafter.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

FIG. 2A is a simplified diagram of an embodiment incorporating a larger number of envelope segments than the system of 1A and 1B;

FIG. 2B is a simplified diagram showing volume change of the system shown in 2A;

DETAILED DESCRIPTION

Figure 1B:
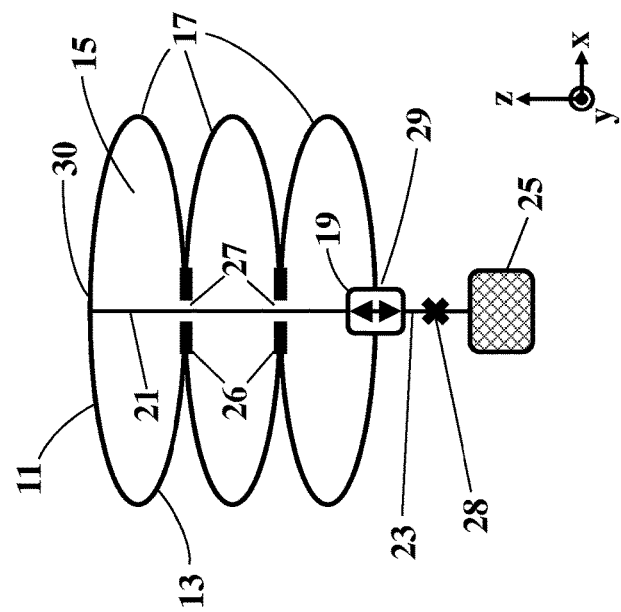
FIG. 1B is a simplified diagram showing volume change of the system shown in 1A.

In the following detailed description of the example embodiments, reference is made to the accompanying drawings that form a part hereof, and in which are shown by way of illustrating specific example embodiments. The example embodiments illustrated are described in sufficient detail to enable those skilled in the art to practice the teachings disclosed herein. Other example embodiments can be utilized and derived therefrom, such that structural and logical substitutions and changes can be made without departing from the scope of the claims. The following detailed description, therefore, is not to be taken in a limiting sense, and the scope of various embodiments is defined only by the appended claims, along with the full range of equivalents to which such claims are entitled.

Buoyant craft gain their lift through use of lifting gas of lower than ambient density. Lifting gas of sufficiently low density can therefore render the craft buoyant (i.e. the craft's average density is lower than the density of the ambient environment). Such craft include unpowered balloons, tethered aerostats, powered airships, and the like. The buoyancy of such craft, and therefore their elevation (i.e. altitude in the atmosphere or submerged depth in a liquid environment), can be controlled by methods and apparatus for increasing and/or decreasing the density of the lifting gas contained within the craft's gas retaining envelope according embodiments disclosed herein. Elevation control can be relative to a distance above or below a reference point. The reference point may be a surface point, a water level, an atmospheric position, layer, depth point, or a center point (e.g. of a circle or a body such as a planet), for example.

In the disclosed embodiments, the density of lifting gas contained within the craft's gas retaining envelope is increased or decreased by mechanically adjusting tension in the envelope in such way as to compress or decompress the volume of lifting gas enclosed within the envelope. These mechanical compression-adjusting means can take many forms disclosed herein. Sufficient compression of the lifting gas within the envelope will ultimately lead to the craft becoming negatively buoyant thereby initiating the craft's descent. The craft will continue its descent provided an adequate compressive load is maintained on the lifting gas volume. If the compressive load is reduced and the volume of the lifting gas is thereby permitted to increase, the craft's rate of descent will accordingly diminish. If the compressive load continues to be reduced to the extent that the average density of the craft becomes less than the density of the ambient fluid environment in which the craft is travelling, the craft's descent will sequentially be arrested, its vertical trajectory will be reversed, and finally the craft will begin to regain elevation. In some embodiments, a motorized cable system tensions the gas retaining envelope thereby controlling pressurization and associated density of the lifting gas within the craft's envelope. In some embodiments, the motor size requirements may be advantageously relatively small to carry out the disclosed and claimed inventions thereby having buoyancy advantages from the relatively light weight and continuously available controlled variable buoyancy solution.

Atmospheric and oceanic density increases significantly with diminishing elevation. As a buoyant craft ascends or descends, its average density seeks equilibrium with the density of its surroundings. This attempt to reach density equilibrium is conspicuously manifested in the fluctuation of the craft's lifting gas volume in accordance with the variation in density of the ambient environment of the craft's immediate surroundings. Accordingly, certain methods and apparatus disclosed herein include obtaining neutral craft buoyancy. Certain methods and apparatus include obtaining negative craft buoyancy. Certain methods and apparatus include obtaining positive craft buoyancy. And, certain methods and apparatus include controlling variable states of neutral, negative, and positive craft buoyancy, and transition between these states. Various purposes of the methods and apparatus for controlling variable vehicle buoyancy are further disclosed herein.

For example, the unconstrained lifting gas volume of a positively buoyant balloon released from the Earth's surface near sea level will expand to approximately three times its original volume by the time it reaches an altitude of ten thousand meters. As suggested above, such a balloon embodiment of the present invention can be returned to ground level by compressing its lifting gas to the point that the balloon is rendered negatively buoyant, provided adequate compressive load is maintained on the lifting gas to keep the balloon negatively buoyant throughout its descent. Thus, the position and/or velocity of elevation change can further be controlled based on the compressive techniques and structures according to the various embodiments. However, as the example balloon embodiment descends to ground level, the increase in atmospheric pressure will ultimately compress the balloon's lifting gas to substantially its original volume (i.e. approximately one-third of the volume it presented at ten thousand meters). Therefore, in order to be able to take advantage of mechanical compression for continuous buoyancy control throughout the full range of elevation travel, the present invention also includes an envelope with the ability to increase and decrease its pressurized volume in accordance with the potentially large range of ambient environment densities that are encountered when an example embodiment craft traverses a large range of elevations. For example, the balloon can be designed to compress its volume to approximately one-third its volume to navigate ten thousand meters.

And, there can be an understanding of methods to determine the reduced compression size to buoyancy state of the craft based on the amount of compression media, length of compression media, compression motor reel retraction rotational positions in/out, and angular positions thereof. For example, the wound compression member can be associated with the reduction in volume and increased compressive pressure applied to the vehicle's internally held gas.

A system and method for elevation control is provided, which can be part of a craft or vehicle. The system comprises (a) a substantially gastight envelope containing lifting gas, whereby the envelope further comprises a plurality of envelope segments in fluid communication with one another, and (b) at least one tension cable connecting at least two of the envelope segments, and (c) a device to adjust the length of a tension cable to thereby change the pressure within the envelope, and (d) a control element to cause the system to operate in ascent, descent, or vertically stationary modes. A motorized cable system tensions the envelope to compress or decompress the lifting gas within the envelope in order to change the density of the lifting gas thereby causing elevational movement of the system. The envelope of the system can furthermore adapt its pressurized volume to permit system mobility throughout great variation in elevational density of the ambient environment.

Figure 1A:
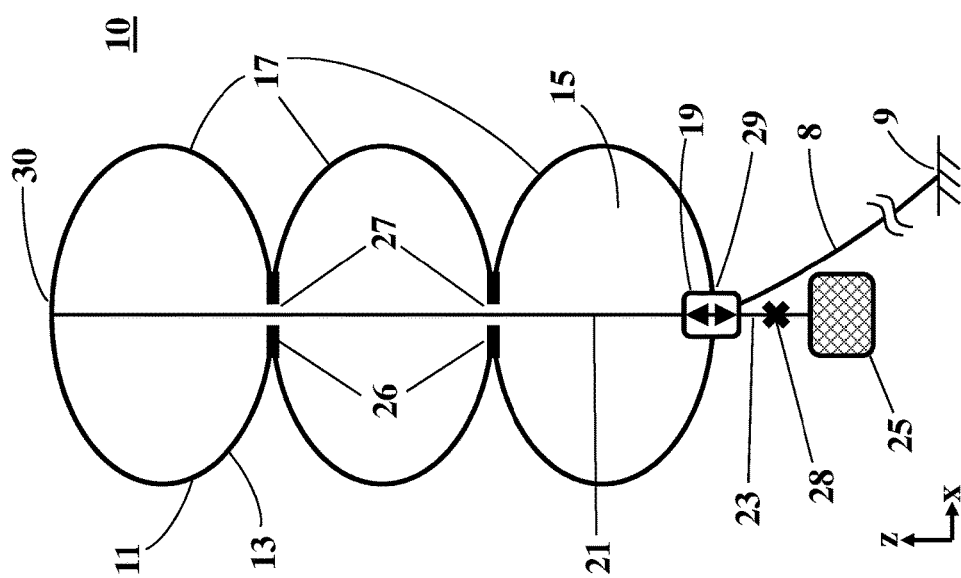
FIG. 1A is a simplified diagram of an embodiment of the elevation control system in accordance with the principles of the present invention.

FIG. 1A is a simplified diagram showing an embodiment of a system and method for elevation control in accordance with the principles of the present invention. The design of FIG. 1A can itself be referred to as craft including the elevation control system 10, which can represent minimum, examples, or subcomponents thereof. The elevation control system 10 includes a balloon 11 that further comprises a substantially gastight, substantially inextensible envelope 13 containing lifting gas 15, a plurality of axially disposed envelope segments 17, which are preferably gas tight without gaseous communication to the ambient outside space, according to several embodiments. The elevation control system 10 includes buoyancy control device including a motor 19, a tension cable 21, a payload support line 23, and a payload 25. The tension cable 21 extends along a centerline of the segments 17. Each of the envelope segments 17 shown in FIG. 1A are in fluid connection to an adjacent envelope segment 17 by means of at least one aperture 27. At least one aperture 27 perforates each substantially gas tight structural connection interface 26 between successive envelope segments 17 thereby allowing lifting gas 15 to move through aperture 27 between envelope segments 17 in the embodiment shown in FIG. 1A. The connection interface 26 forms a substantially planar contact region between sequential envelope segments 17. This area of contact can be modified in accordance with requirements, for example, whereby a connection interface 26 of larger contact area can increase rigidity of the pressurized envelope 13 of the balloon 11, or whereby the connection interface 26 allows modular connection, addition, or removal of balloon segments. Tapes or adhesive bands can be applied to the inside or outside surfaces of envelope 13 to structurally reinforce the connection between successive envelope segments 17 in ways commonly known to those familiar with the art.

Figure 1D:
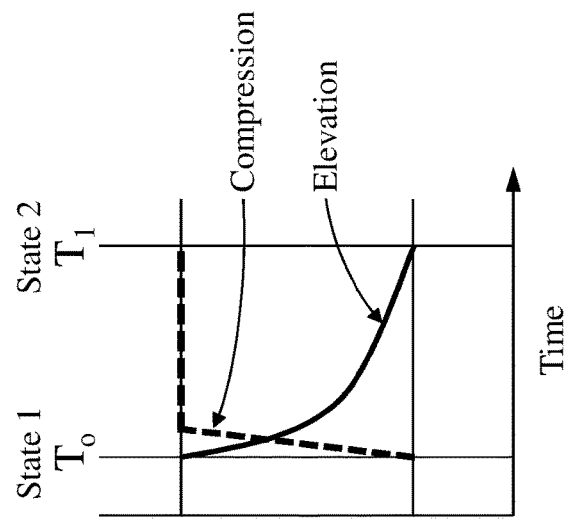
FIG. 1D illustrates compression and elevation profiles as related to different system states at different elevations.

In the embodiment pictured in FIG. 1A, the motor 19 is attached at or near a polar apex 29 of the envelope 13. The tension cable 21 is positioned inside the envelope 13 whereby a first extremity of the tension cable 21 is attached at or near the inside surface of an opposing polar apex 30 of the envelope 13. The tension cable 21 passes through an aperture 27 between each successive envelope segments 17 to allow the opposing second extremity of tension cable 21 to attach to the motor 19. The attachment of the tension cable 21 to the motor 19 is such that the motor 19 can effect change in the distance between a polar apex 29 and opposing polar apex 30 of the balloon 11 by adjusting the length of the tension cable 21. Thus, the motor 19 is an example of a tension adjusting means. If only a portion of the envelope 13 needs to undergo compression, the tension cable 21 can also be configured to selectively, or by design choice, connect the motor 19 to any one or more of connection interface 26 joining adjacent envelope segments 17. An aperture 27 through which tension cable 21 passes can be of different configuration and attributes than an aperture 27 that may be configured to best facilitate unimpeded flow of lifting gas 15 between envelope segments 17. An aperture 27 through which tension cable 21 passes can specifically configured to best facilitate unimpeded travel of the tension cable 21 in its function of effecting compression and decompression of the envelope 13 of balloon 11. Referring now to the perspective view of the embodiment connection interface 26 as shown FIG. 1I, it becomes apparent that the aperture 27 described earlier can serve different purposes. FIG. 1I shows an embodiment connection interface 26 having one tension cable aperture 97 and four lifting gas apertures 98. A preferred embodiment tension cable aperture 97 ensures maintenance of a linear path of tension cable 21 which in turn ensures uniform compression and distension of the assembly of envelope segments. As such, the preferred embodiment tension cable aperture 97 need only be sufficiently large to permit unimpeded travel of the tension cable 21 through the connection interface 26. Conversely, the embodiment lifting gas apertures 98 are much larger than the tension cable aperture 97 due to the requirement of the lifting gas apertures 98 to permit rapid passage of potentially large volumes of lifting gas between adjacent envelope segments 17.

The elevation control system 10 may also include a cut-down system 28 that can be activated to separate the payload 25 from the balloon 11. The payload 25 may incorporate a device such as a parachute to reduce the velocity of the descent of the payload 25 after separating from the balloon, or to reduce the velocity of descent of all or a portion of the elevation control system 10. The payload 25 may also include shock absorbing materials such as fiber honeycomb or inflatable airbags to attenuate landing impact forces. The payload 25 may be buoyant in water in the instance of an aqueous landing. The cut-down system 28 may be activated for many reasons such as to return the elevation control system 10 or the payload 25 to the ground for maintenance or repair, to recover data from the payload 25, or to recover the payload 25 due to unforeseen or undesirable change in trajectory of the elevation control system 10. Only a portion of an embodiment payload, for example a portion including data, may be separated from the rest of the payload and balloon. The cut down system 28 can use any of several different commonly applied methods to sever the connection between the payload 25 and the balloon 11. Such common methods include explosive bolts, cutting knife mechanisms, an electric hot knife to melt the payload support line 23, the like, or other means to disconnect the payload 25 therefrom. The envelope 13 of the elevation control system 10 may also include a valve or rip panel or other conventional means to release lifting gas from a balloon envelope to cause the elevation control system 10 to descend. Such means to release lifting gas will be required by many air traffic regulatory bodies and is useful in case of unforeseen events or technical failure.

The elevation control system 10 may also be connected to one extremity of a tether 8, whereby the opposing extremity 9 of tether 8 can be attached to a vehicle such as a truck or to a fixed object at ground level. The tether 8 can be used to maintain the elevation control system 10 in a relatively specific spatial location. Opposing extremity 9 of the tether 8 can be attached to a winch that permits further elevational control of the elevation control system 10.

Still referring to FIG. 1A, the buoyancy of elevation control system 10 can be controlled as follows: To facilitate ascent of elevation control system 10, envelope 13 of balloon 11 must contain sufficient lifting gas 15 to render the elevation control system 10 positively buoyant, i.e. the average density of elevation control system 10 must be less than the density of the ambient environment surrounding elevation control system 10. Without the altitude control methods contemplated by the current embodiment, the positively buoyant elevation control system 10 ascends unimpeded in search of density equilibrium with its surrounding environment. Conversely, pressurization of the lifting gas 15, of the embodiment shown in FIG. 1A, facilitates control of the buoyancy, and therefore also the elevation, and the rate of change of elevation, of the elevation control system 10. Buoyancy control is thus possible when the lifting gas 15 is pressurized: The motor 19 applies a tensile load to the tension cable 21 so as to tension the envelope 13, thereby pressurizing (i.e. compressing to higher than ambient pressure) the lifting gas 15. According to this embodiment, the segments 17 are in gaseous communication to permit movement of lifting gas 15 throughout the balloon's compression and decompression processes to facilitate pressure equilibrium of lifting gas 15 throughout the envelope 13.

As the positively buoyant elevation control system 10 ascends, retraction (i.e. shortening) of the tension cable 21 by the motor 19 progressively tensions the envelope 13, thereby compressing and increasing density of the lifting gas 15, and thereby slowing the ascent of elevation control system 10. Sufficient further retraction of tension cable 21 increases cable tension, ultimately arresting ascent of the elevation control system 10 and reversing the vertical trajectory of the elevation control system 10, i.e. the elevation control system 10 becomes negatively buoyant and begins to descend. The elevation control system 10 will continue to descend as long as the motor 19 maintains sufficient load on the tension cable 21, and thereby sufficient compression of the lifting gas 15 to keep the elevation control system 10 negatively buoyant. Continued descent does not require the pressure differential to be significant, and therefore the tension cable 21 load need only be kept relatively constant. If the balloon 11 is in a pressurization state that renders the elevation control system 10 neutrally buoyant and therefore maintaining substantially constant elevation, then a reduction in tension cable 21 load will allow the pressurized lifting gas 15 to expand, thereby rendering the elevation control system 10 positively buoyant: the elevation control system 10 begins to ascend. Conversely, increase in tension cable 21 load will further compress lifting gas 15, thereby rendering the elevation control system 10 negatively buoyant: the elevation control system 10 begins to descend.

The degree of lifting gas 15 pressurization need only be incrementally greater than the pressure of the ambient environment to provide elevation control. However, a higher baseline pressure differential between lifting gas 15 and the ambient environment provides opportunity for greater elevation control system responsiveness, as well as greater rates of ascent and descent. The pressurized (i.e. so-called "superpressure") envelope of the embodiment elevation control systems is also much more resistant to turbulence and other inclement ambient environmental conditions than is offered by alternate designs based on zero-pressure buoyant vehicles (e.g. U.S. Pat. No. 7,469,857, issued to Voss and U.S. Pat. No. 9,033,274, issued to DeVaul, et al.).

If buoyancy control over a large elevation range is desired, the embodiment balloon 11 must be capable of maintaining its lifting gas 15 under pressure over a large range of envelope 13 volumes. FIG. 1B is a simplified diagram showing how the embodiment envelope 13 of FIG. 1A is capable of adapting its pressurized volume to a large range of ambient environment densities. As shown schematically in FIG. 1B, the accordion-like configuration of the envelope 13 of the elevation control system 10 allows the envelope to adapt to the higher ambient densities associated with lower elevations while still maintaining elevation control by keeping the lifting gas 15 under pressure. The lifting gas 15 is thereby ultimately confined to a relatively small residual envelope 13 volume.

Referring to the configuration shown in FIG. 1B, release of a sufficient portion of the tensile load on the tension cable 21 will permit the pressurized lifting gas 15 to expand, thereby increasing the volume of the envelope 13 and rendering the elevation control system 10 positively buoyant. The elevation control system 10 ascends because its average density is lower than the ambient density. In order to maintain ascent, the tension cable load may be kept substantially constant, however the motor 19 must continuously pay out (i.e. release additional length of) tension cable 21 to allow the envelope and its enclosed volume of lifting gas 15 to expand as the lifting gas 15 seeks density equilibrium with the increasingly lower density surroundings associated with greater elevation. The rate of ascent of the elevation control system 10 can be controlled by adjusting the load on the tension cable 21 as it is being payed out. Complete release of tension cable 13 load will present the greatest rate of ascent of the elevation control system 10 due to substantially unencumbered expansion of the balloon's lifting gas 15.

Ascending through the continuously decreasing density of the ambient environment, the volume of the lifting gas 15 will ultimately increase to fill the fully distended configuration of the balloon envelope 13 pictured schematically in FIG. 1A. The substantial inextensibility of the embodiment envelope 13 of the ascending balloon 11 precludes further increase in the volume of the lifting gas 15, thereby arresting ascent of the elevation control system 10 when the average density of the elevation control system 10 reaches equilibrium with the density of the ambient environment. Full release of load on the tension cable 21 will substantially define the maximum achievable elevation of the elevation control system 10. The balloon envelope 13 must be of sufficient strength to restrain the pressure of the lifting gas 15 under maximum tension cable 21 load, as well as the maximum float elevation of the elevation control system 10 with no associated tension cable load.

Figure 1C:
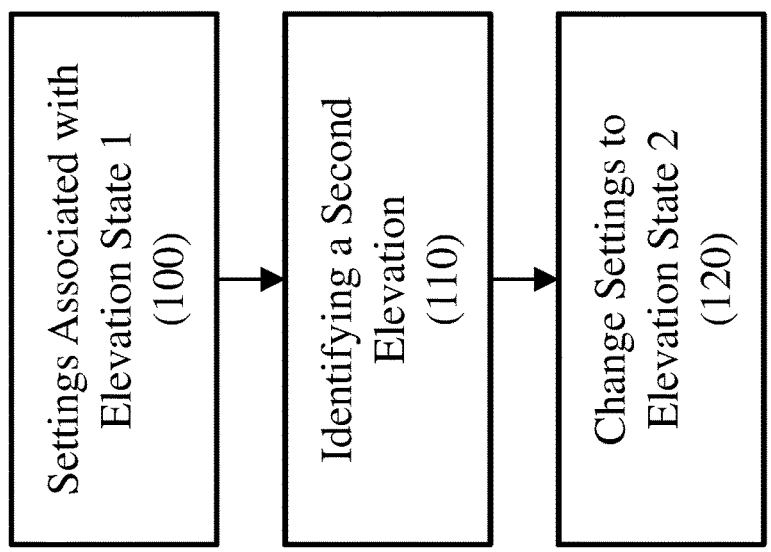
FIG. 1C illustrates a method of controlling elevation of a craft.

An example of another method of controlling elevation of a craft is illustrated in FIG. 1C. The method of controlling the elevation of the craft can be performed using the elevation control system and methods discussed with reference to FIGS. 1A and 1B, for example. The method illustrated in FIG. 1C includes determining settings associated with a first elevation state (100). The first elevation state may be a relatively high elevation where the craft remains in elevation equilibrium. The craft currently is being held in a neutral elevational position where the upward buoyancy of the craft is equal to the downward gravitational pull so as to keep the craft in a relatively static vertical elevation position.

Each neutral buoyancy state can include a compression setting. The compression setting can be a level of compression that equates the buoyancy of the craft with the ambient outside conditions at a particular elevation. A neutral buoyancy state at a corresponding elevation is such that the buoyancy of the craft is substantially equal to the force of gravity on the craft thereby holding the craft at the substantially stable elevation. The elevation can be determined by a signal received, atmospheric pressure sensed, or calculation performed to determine the elevation of the buoyant craft. Thus, the compression settings associated with the neutral buoyance state can be correlated and saved for reference or to return the craft to the similar elevation and state. The compression setting can be associated with a cable tension or a difference in pressure between the inside of the balloon envelope and the surrounding ambient environment.

The method includes identifying a second desired elevation (110). The method can include determining a desired change, or difference, in elevation of the craft between the first and second elevation. The method can also include determining settings and conditions associated with the second elevation. The settings can include compression settings, cable retraction settings, motor winding settings, or other second elevation state system settings associated with positioning the craft at the second elevation. The method can further include determining a compression attribute associated with the second elevation. The compression attribute can include consideration of an amount of compressive force to be applied to the gas tight chamber. The compression attribute can include consideration of a compression cable attribute. The compression cable attribute can include consideration of a tension to be applied to the cable. The tension applied to the cable can be applied to the cable by a motor. The tension applied to the cable by the motor can be a winding attribute of the motor. The motor can include a stepper motor. The winding attribute of the stepping motor can include an amount of steps, winding, or rotations (or partial rotations or angle attribute) of the rotor of the stepper motor.

The compression cable attribute can also include a measured or predetermined amount of tension applied to the compression cable. The level of tension applied to the tension cable can be determined according to a tension sensor that senses tension of the cable, e.g. by how tight the cable is held by the motor. The motor can include a sensor that senses a level of resistance to tension the cable thereby measuring the compression cable attribute. Levels of tension can be stored in a look-up table along with corresponding data related to ambient pressure, internal envelope pressure, lift characteristics, and elevation.

After the desired change in elevation is determined, settings of the elevation control system are changed according to a second elevation system state (120). The settings associated with the compression cable attribute can be modified to change the compression attribute of the gas tight chamber as previously discussed. The setting associated with the compression attribute of the chamber can be changed by a modification to a setting associated with the tension applied to the compression cable to increase, or decrease, the tension of the tension cable on the air tight camber also as previously discussed.

For example, with cross-reference to FIG. 1A and FIG. 1D, it can be determined that the elevation control system 10 is to decrease in elevation at $T_o$ from State 1. At $T_o$, the elevation system is in State 1 where the elevation is relatively high and the compression is relatively low. At $T_o$, a controller receives and/or transmits a compression signal, the compression signal can include a change in voltage to change a position of a rotor of the motor causing the motor to increase tension in a cable and increase corresponding compression as shown in FIG. 1D. The settings of the elevation control system can be changed to elevation control system settings associated with a second state (120). The second state can be an elevation equilibrium state associated with the lower elevation. As shown in the embodiment of FIG. 1B, the compression signal is associated with a change in distance between opposing polar apex 29 and opposing polar apex 30 on opposing sides of envelope segments 17 as shown in a comparison between FIG. 1A in State 1 and FIG. 1B in State 2 (120). FIG. 1D illustrates an example of compression and elevation profiles and the correspondence there between different elevation control system states.

The compression signal can include a motor 19 control signal. The motor control signal can direct the motor to change a tension attribute of the tension cable 21 between the opposing apexes 29 and 30. The compression signal can direct the motor 19 to shorten the distance between the opposing apexes 29 and 30 thereby compressing the segments 17, placing the opposing apexes 29 and 30 in a relatively closer position as shown in FIG. 1B. When placed in the position of FIG. 1B, the craft and elevation control system 10 has a reduction in the volume of which the segments 17, holding lifting gas, displace. This lower displacement volume of the lifting gas 15 causes the elevation control system to be become less buoyant with respect to the ambient outside environment thereby changing the corresponding elevation of the craft and elevation control system 10.

The elevation control system 10 can determine conditions associated with a neutral buoyancy state. The neutral buoyancy state can be associated with an elevation. Different elevations are associated with corresponding neutral buoyancy attributes at that elevation's neutral buoyancy state.

The methods of changing the elevation of the craft can include determining a rate of elevation change of the craft. The rate of elevation change of the craft can be determined by a level of compression corresponding to a level of buoyance differential between the craft and the ambient outside gaseous environment and conditions.

The change in the elevation and desired velocity of change can related to an initial "over-compression" so as to rapidly accelerate the velocity of change in elevation of the craft followed by an "under-compression" so as to more rapidly slow the velocity of the change in elevation to the second desired elevation.

Figure 1F:
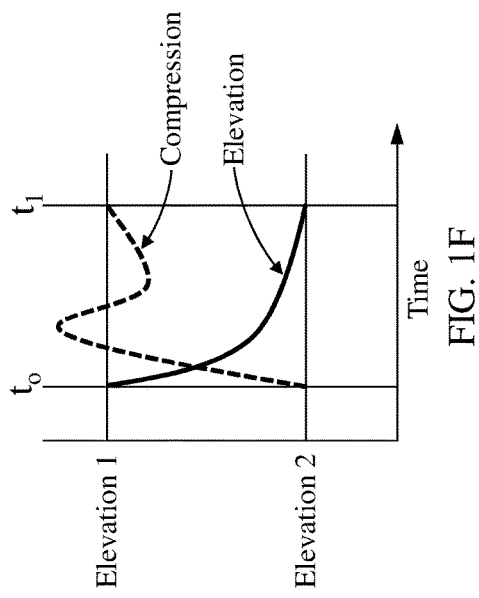
FIGS. 1F and 1G illustrate elevation and compression profiles related to rising and falling in elevation.
Figure 1G:
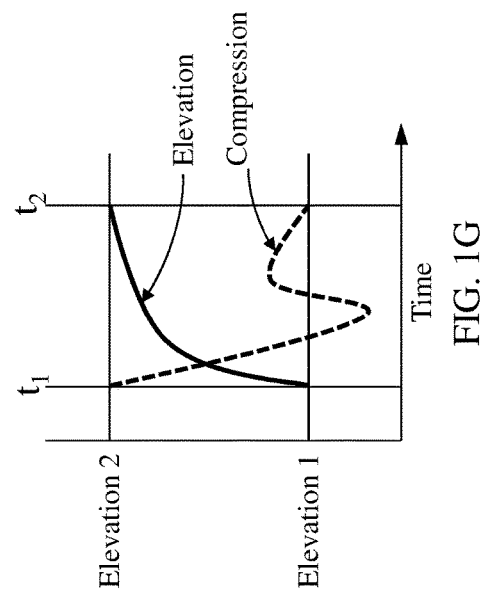
Figure 1E:
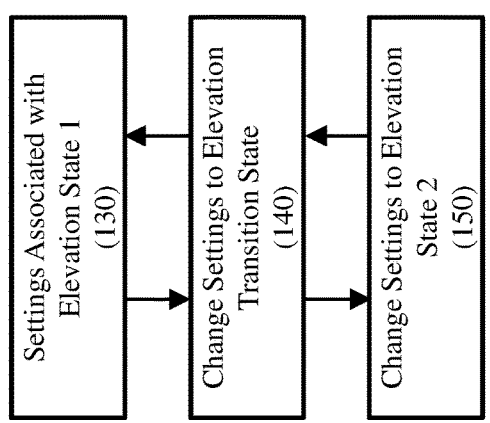
FIG. 1E illustrates a method of controlling elevation of a craft.
Figures 1H, 1I:
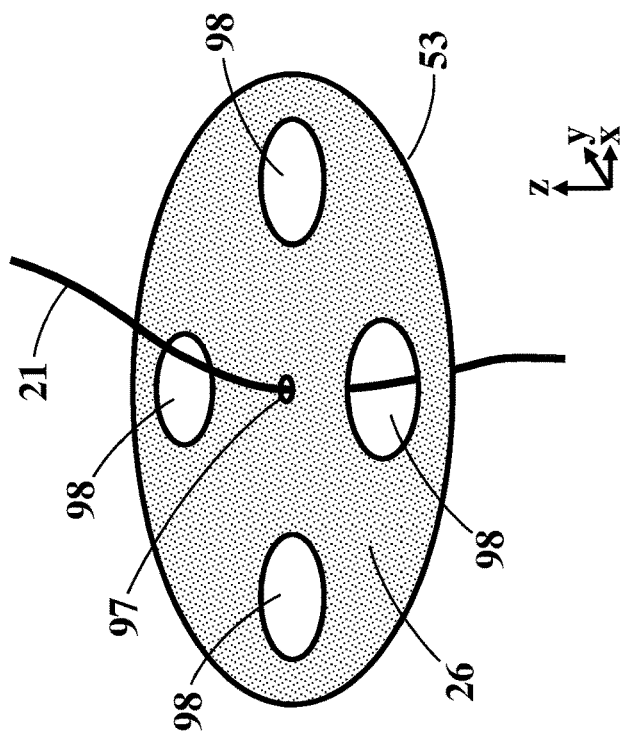
FIG. 1H illustrates a control-related data structure that can be previously stored, updated and/or created.
FIG. 1I is a simplified perspective view of an inter-segment connection interface with apertures.

Referring to FIGS. 1E, 1F, and 1G, a method for controlling an elevation control system is illustrated. The methods illustrated in FIGS. 1E, 1F, and 1G illustrate that the change in compression settings can be non-linear and not always directly set to a static setting in order to effect a new elevation of buoyancy equilibrium or to react to other experience conditions by variable mechanical contraction. For example, in this illustration, the elevation system is set to a first initial elevation equilibrium position (130). Upon determining a change in elevation position, the elevation system settings are changed to an elevation transition state (140). The elevation transition state can include a series of compression settings to optimize the manner in which the elevation system controls the elevation of the craft.

As illustrated in FIG. 1F, the compression setting(s) of the elevation control system can "over compress" the sections of the chamber envelope in order to more quickly change the elevation of the craft. After the craft nears the desired elevation, the compression can be released to, or beyond as shown in FIG. 1F, in order for the craft to arrive at the desired elevation according to the control of the elevation control system. Ultimately, the settings of the elevation control system are set to the equilibrium buoyancy settings associated with the second elevation state. And, to return the craft to the original elevation position (or another elevation), the procedure can be reversed (140 to 130) as illustrated in FIG. 1G. Thus, different linear and non-linear compression states can be used to control the buoyancy of the craft using the elevation control systems.

Various data structures including look-up tables, storage of sensed data, and functional control settings can be stored in data storage media. FIG. 1H illustrates an example of a data structure that stores elevation and mechanical compression data. The elevation data structures (1 to N) and compression data structures (1 to N) can be settings based on a compression attributes associated with different elevations. The compression attributes can be associated with a volume displacement attribute of a chamber. The data structures can be specific to a particular craft. And, data structures can be generated using computer generated modelling of the buoyant characteristics of a craft. Various other data can be predetermined, determined during use, and/or continuously updated based on sensed conditions.

As can be deduced from the preceding, the large compression ratio of maximum to minimum pressurized volume of the envelope of an embodiment elevation control system can permit a correspondingly large elevation range to be traversed by a craft incorporating such an elevation control system. FIGS. 2A and 2B are simplified diagrams that show another embodiment that demonstrates how the compression range, and associated operational elevation range, can be further increased. The balloon 12 of FIGS. 2A and 2B differs from balloon 11 of FIGS. 1A and 1B in that balloon 12 has a greater number of segments 18. With retraction of the maximum possible length of tension cable 22 by motor 19, the pressurized gas within the tensioned envelope 14 will approach its minimum effective volume. Top envelope segment 52 and bottom envelope segment 69 will partially distend as they accumulate most of the remaining lifting gas in the envelope due to compression of the intermediate segments 49. As graphically shown in FIG. 2B, balloon 12 with a larger number of segments will present a larger compression ratio, and therefore greater elevation range capability, than balloon 11.

Figure 3B:
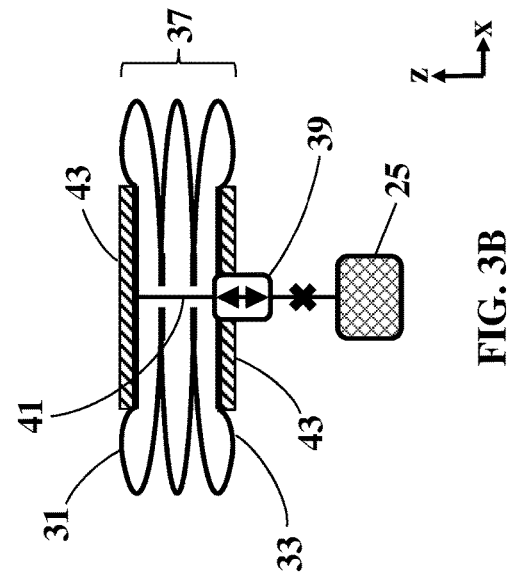
FIG. 3B is a simplified diagram showing volumetric compression of the system shown in FIG. 3A.
Figure 3A:
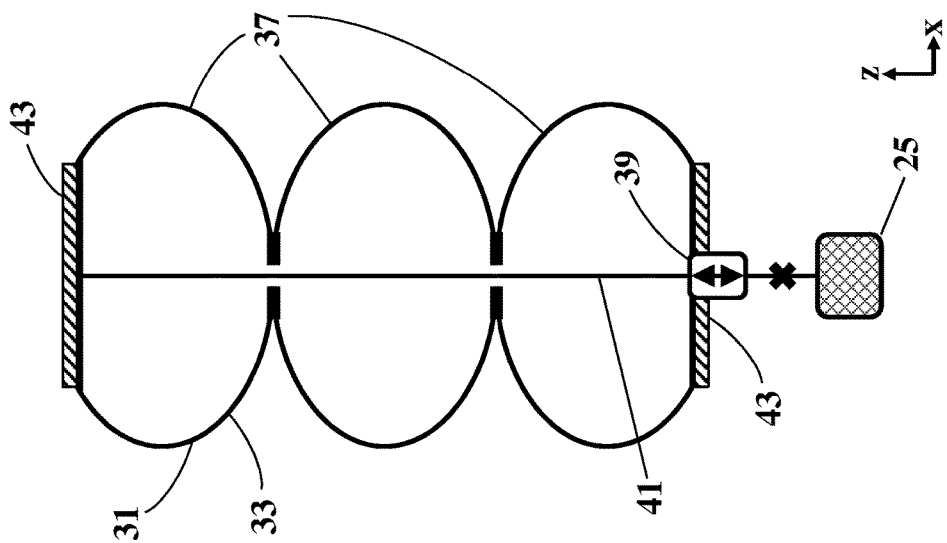
FIG. 3A is a simplified diagram illustrating an embodiment that alters the compression ratio of the system.

Referring now to the simplified diagram of the embodiment shown in FIGS. 3A and 3B, the compression ratio of the balloon 31 can be increased by incorporating one or more substantially inflexible compression members 43, acting on the balloon envelope 33, to further increase the elevation range that is made accessible by the elevation control system. While two compression members 43 are pictured, alternate embodiments may provide one compression member 43, or more than two compression members 43. Compression members 43 may be attached to the inside or outside of the balloon envelope 33 or, as schematically pictured in FIGS. 3A and 3B, not directly attached to the envelope 33. In some embodiments the tension cable 41 can sealingly pass through the envelope 33 to connect to the compression member 43. In alternate embodiments, the tension cable 41 can structurally connect to a substantially gas-tight fitting traversing the substantially gas-tight membrane of the envelope 33 such that the fitting facilitates structural connection to the compression member 43. Through direct or indirect structural connection of the compression member 43 with the loads induced by the motor 39 and translated by the tension cable 41, the intent of the compression member 43 is to more efficiently collapse and compress the stack of balloon segments 37, as schematically demonstrated in FIG. 3B, with the goal of effectively reducing the residual pressurized volume of the substantially collapsed envelope 33. In various example embodiments, compression members 43 may take the form of discs, hoops, rods, tubes, plates, non-uniform and/or complex shapes of any suitable material, configuration, or geometry that supports the goal of reducing the pressurized volume of the collapsed envelope 33. FIG. 3C schematically shows yet another embodiment compression member to modify compression behavior of the elevation control system. A conical-planar flange 64 is attached to the inner top surface of the top segment 58 of envelope 54 such that the load on the tension cable 62 causes less deflection and more uniform loading of the top surface 66 of the envelope 54.

Figure 3D:
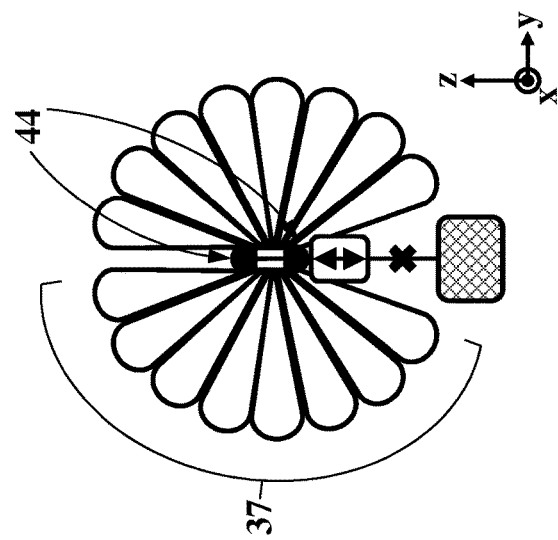
FIG. 3D is a simplified diagram showing volumetric compression of a system incorporating linear compression members.
Figure 3C:
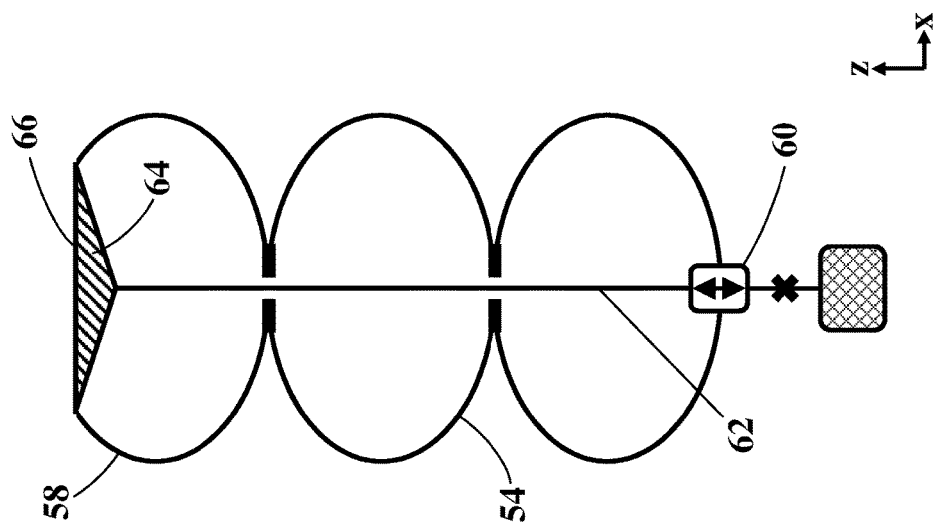
FIG. 3C is a simplified diagram showing further embodiments to modify compression behavior the elevation control system.

We refer now to the embodiment envelope pictured in FIG. 3D that incorporates linear compression members 44 such as a rod or tube, and whereby the compression members 44 are positioned in the X-Z plane. Viewed in the Y-Z plane, the embodiment envelope schematically shows the radial compression geometry, associated with minimum envelope volume, as induced through incorporation a such linear compression member 44. A similar radial compression geometry can be obtained through incorporation of the planar flange 64 shown in FIG. 3C. Comprising a larger number of balloon segments 37 than the envelopes pictured in FIGS. 3A and 3C, the embodiment pictured in FIG. 3D is conducive to minimizing the compressed volume of compressed balloon envelopes comprising a larger number of segments 37.

Another example embodiment compression member configuration may incorporate more than one planar flange 64 (not pictured) attached to the inner top surface of top segment 58, whereby the more than one planar flange 64 are positioned in star-like configuration in different radial planes with respect to the tension cable 62. Yet another embodiment may incorporate a conic interface (not pictured) between the tension cable 62 and the inner surface of the top segment 58, wherein the apex of the cone attaches to the tension cable and the circular base of the cone attaches to the top segment 58.

Figure 4B:
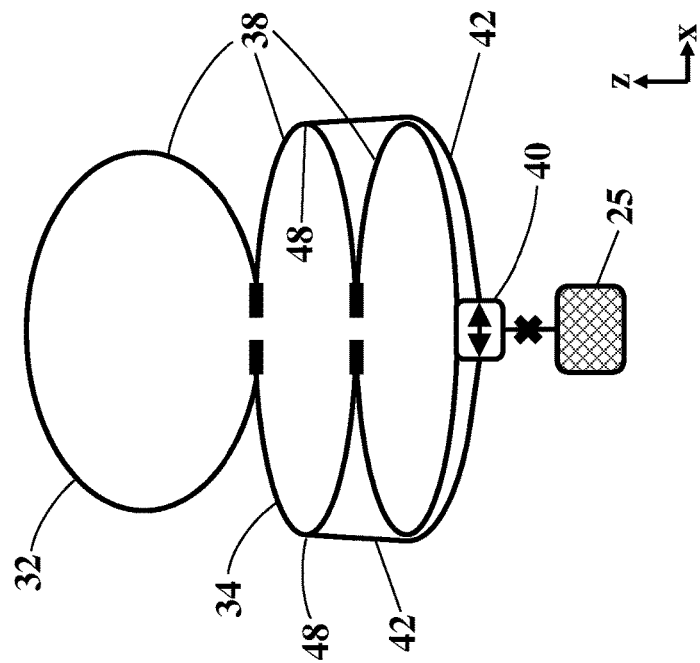
FIG. 4B is a simplified diagram showing a second embodiment incorporating alternate arrangements of tension cables.
Figure 4A:
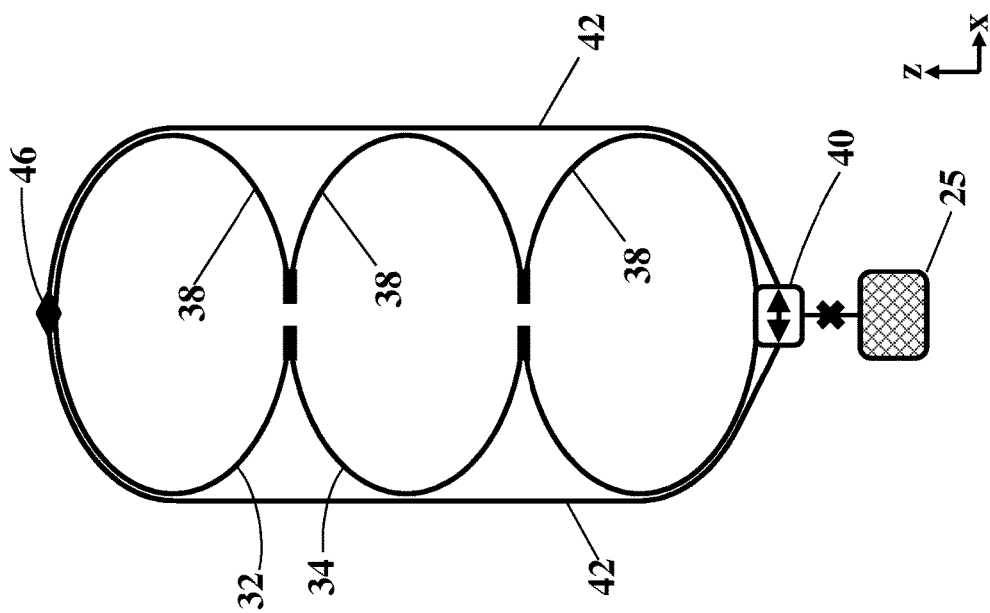
FIG. 4A is a simplified diagram showing a first embodiment incorporating alternate arrangements of tension cables.

Other embodiments also provide alternate and potentially advantageous arrangements of tension cables. As schematically shown in FIGS. 4A and 4B, tension cables 42 can be routed on the exterior of the envelope 34 of the elevation control system. The tension cables 42 of the embodiment shown in FIG. 4A connect the upper envelope apex 46 to the compression motor 40, while the tension cables 42 of the embodiment shown in FIG. 4B can be configured to compress only a portion of the stack of envelope segments by connecting the motorized tension cable 42 to an alternate intermediate location 48 on the exterior of the envelope, the intermediate location 48 being located between a top and a bottom of the envelope 34. The intermediate location 48 can be associated with a particular segment, portion, or set of segments forming an independently collapsible portion of the envelope 34.

Figure 5A:
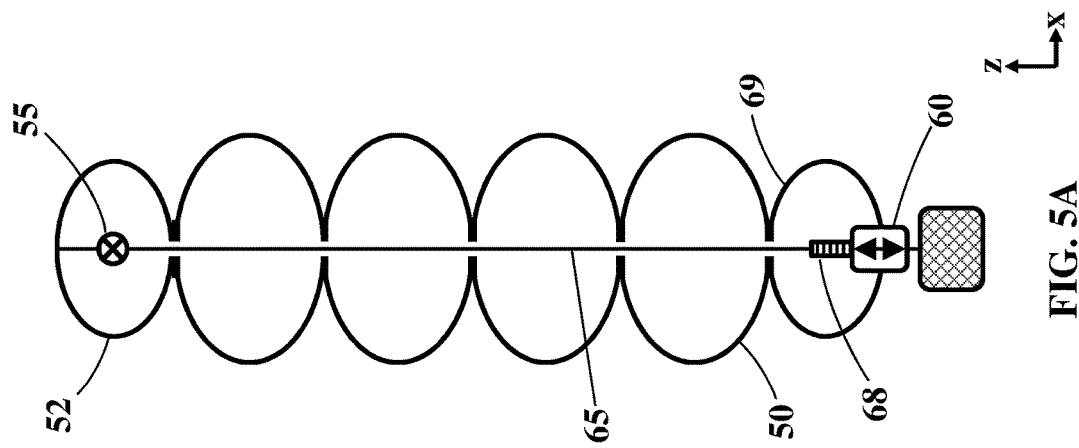
FIG. 5A is a simplified diagram showing embodiments to modify compression behavior the elevation control system.
Figure 5B:
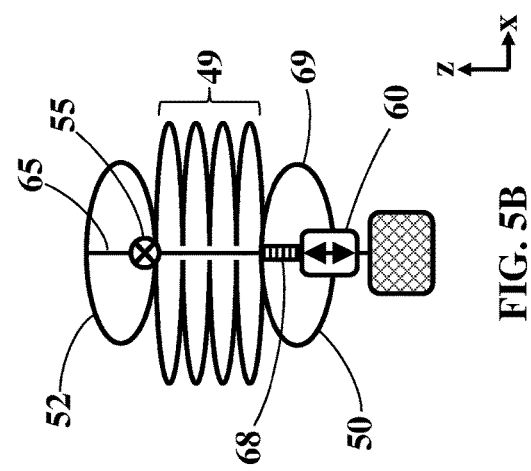
FIG. 5B is a simplified diagram showing volumetric compression of the system shown in FIG. 5A.

FIGS. 5A and 5B schematically show further embodiments to modify compression behavior of the elevation control system. In FIG. 5A an obstruction mass ("stopper") 55 of sufficiently large size to preclude its passage through aperture 27 is attached to tension cable 65. As shown in FIG. 5B, the stopper 55 can be positioned along the tension cable 65 such that, upon retraction of tension cable 65 by motor 60, the collapsibility of the top segment 52 of the envelope 50 is resisted by the stopper 55, and the position of the stopper 55 thereby functions as volume control element for the pressurized top segment 52. Other embodiments may incorporate other stoppers and obstruction mass attached to the tension cable between the bounding apertures of more than one envelope segment. An independent yet similar embodiment is also shown in FIGS. 5A and 5B. An obstruction mass in the form of a compression tube 68 is positioned in the bottom segment 69 of the envelope 50 between the motor 60 and aperture 65. The tension cable 62 passes through the compression tube 68 such that, in similar fashion to stopper 55, the compression tube 68 resists collapse of the bottom segment 69 of the envelope 50 upon retraction of tension cable 65 by motor 60. A further benefit of the embodiments pictured in FIGS. 5A and 5B is that the pressurized top segment 52 and bottom segment 69 of the envelope 50 resist distortion by the tension cable load by remaining substantially inflated. Top segment 52 and bottom segment 69 thereby also provide more uniform compression of the intermediate envelope segments 49.

Figure 6B:
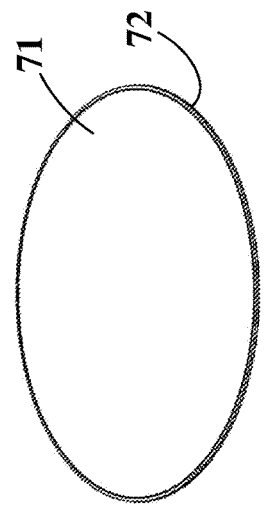
FIG. 6B is a simplified perspective view showing fabrication of a design for a simple envelope segment in accordance with the embodiment shown in FIG. 6A.
Figure 6C:
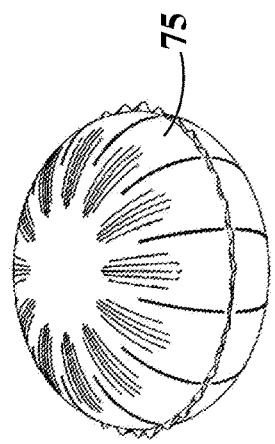
FIG. 6C is a simplified perspective view showing inflation of a design for a simple envelope segment in accordance with the embodiment shown in FIG. 6A.

Embodiments of the elevation control system may have an envelope comprising segments of substantially same size and shape. Other embodiments may have an envelope wherein some, or all, segments are of different size, or shape or symmetry. Different configurations of segment size and shape and degree of symmetry present the opportunity to modify numerous performance attributes such as mobility, compression ratio, and dynamic behavior of the elevation control system and of any craft incorporating such elevation control system. While a great range of segment geometries can be incorporated in the elevation control system of the current invention, it is clearly advantageous if the system has an envelope comprising segments that have attributes favorable to the efficient operation of the elevation control system and of any craft incorporating such a system. Favorable attributes would generally include high specific strength (i.e. strength-to-weight ratio), predictable performance and structure, predictable compression and distension behavior, ease of manufacture, ease of system integration, efficiently collapsible geometry, low packaged encumbrance, low cost, etc. An embodiment envelope including segments illustrative of many such favorable attributes is shown schematically in FIG. 6A. The pictured example envelope embodiment 73 includes embodiments and various improvements and distinguishing features to the discussion by the inventor's own in US Patent entitled FLEXIBLE VESSEL, issued May 29, 2012, U.S. Pat. No. 8,186,625, inventor de Jong, the contents of which are hereby incorporated by reference herein. An elemental version of the pictured embodiment comprises a plurality of segments 77, each of which resembles a child's Mylar® balloon. As schematically shown in FIG. 6B, such a balloon is fabricated simply by sealingly connecting two same-size planar circles 71 and 72 of substantially gastight material around their edges. As shown in FIG. 6C, the balloon 75 inflates to present a distinctive, oblate-spheroidal geometry. Referring to FIG. 6A, sequential attachment to one another of a plurality of segments 77 incorporating the design approach of simple balloons such as those shown in FIG. 6B presents the embodiment envelope 73, wherein each of the envelope segments 77 are in fluid connection to an adjacent envelope segment 77 by means of an aperture 85.

Mylar® is an example of a polyester film material made from stretched polyethylene terephthalate (PET) and is used for its high tensile strength, chemical and dimensional stability, transparency, reflectivity, gas and aroma barrier properties, and electrical insulation. Metallized boPET is intended to be used for solar sails as an alternative means of propulsion for spacecraft such as Cosmos 1.

Figure 6D:
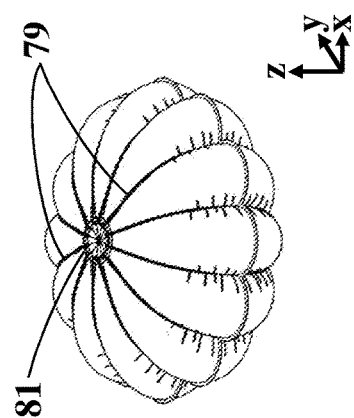
FIG. 6D a simplified perspective view showing inflation of a design for a reinforced envelope segment in accordance with the embodiment shown in FIG. 6A.
Figure 6A:
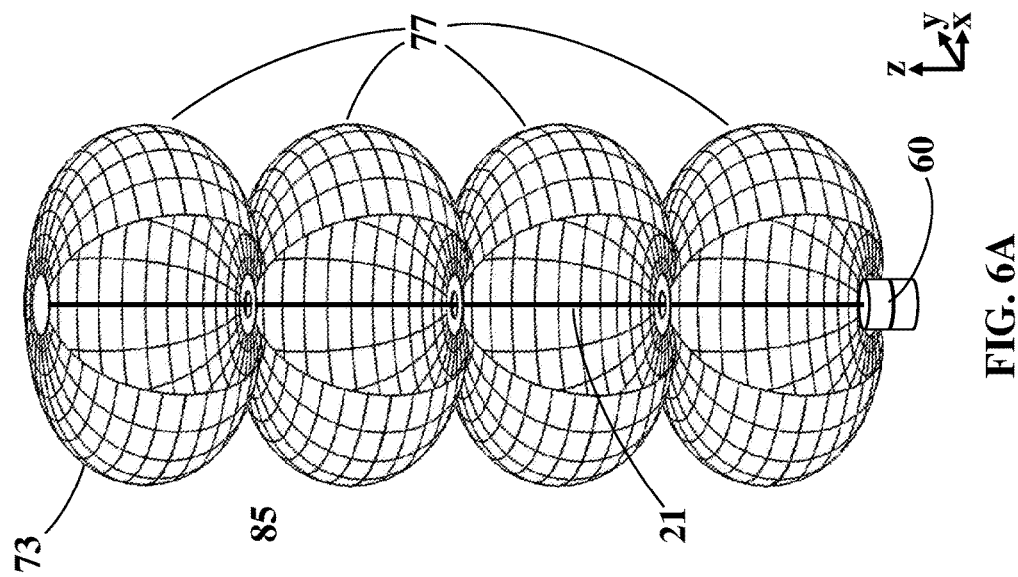
FIG. 6A is a simplified, cut away perspective view of an elemental embodiment of the envelope of the elevation control system.

Referring now to FIG. 6D, also further to U.S. Pat. No. 8,186,625, issued to de Jong, a reinforcing meridional array of flexible fiber tendons 79 is superimposed over the balloon 75 of FIG. 6C. The design approach pictured in FIG. 6D can likewise be applied to segments of a high strength envelope embodiment for the system of the present invention. Such reinforcement permits fabrication of larger and more pressure resistant envelope segments that can be attached to one another in like fashion to the embodiment pictured in FIG. 6. The resulting embodiment envelope's larger size and improved tolerance to high internal lifting gas pressures can offer benefits such as greater payload carrying capacity and speed of ascent and descent of the elevation control system. A further benefit of the embodiment incorporating meridional tendon reinforcement is that the global pressure load of each segment is transmitted by the tendons to the two polar rings 81 corresponding with the polar apex of each segment. Connection of segments to one another by their respective polar rings transfers almost all structural loads from the envelope's gas barrier fabric to the tendon array, thereby providing an envelope of exceptional strength and robustness. The polar rings 81 can be made of flexible fibers, or of rigid materials such as metal or composites. The polar rings 81 can be simple rings, or can take the form of plate-like rigid bulkheads to accommodate multiple features such as fasteners to which the end terminations of an individual segment's tendons can be attached, envelope gas barrier seals, fasteners to connect adjacent balloon segments, etc. As described below, the aforementioned plate-like rigid bulkheads enhance modular assembly of the balloon envelope. The implementation of tendons and polar rings and associated features is described in detail in U.S. Pat. No. 8,186,625, issued to de Jong. By incorporating the planar construction method shown in FIGS. 6B, 6C, and 6D, the natural and predisposed ability of embodiment envelopes comprising segments fabricated in such planar fashion is to efficiently collapse to re-assume the original planar geometry associated with fabrication. This attribute allows the envelope assembly to alter its volume while minimizing trauma to the envelope materials.

As can be deduced herein, a significant aspect of the elevation control system of the current invention lies in its adaptability and versatility. The ability to incorporate or omit the reinforcing tendon array shown in FIG. 6D is exemplary of the elevation control system's adaptability. Inclusion of a tendon array is more complex, but as suggested above, the technology can support immense envelope size and high internal lifting gas pressures, as well as a corollary high speed of ascent and descent. Conversely, a different embodiment of the same invention will accomplish somewhat similar capabilities-without incorporation of tendons: The design approach is to define the largest size envelope segment that can withstand the pressure loads using the preferred envelope fabric or film, thereafter simply adding a sufficient number of segments to obtain the requisite payload mass capacity. While this second embodiment has limitations that do not match the ability of the tendon-based design for very large payload capacity, as discussed below, the non-tendon embodiment offers benefits in ascent and descent speed using a much smaller motor and without need for higher pressurization. This design approach is an effective tool to optimize system performance and cost, especially for smaller payload capacity embodiments.

Besides the substantially gastight connection between successive envelope segments, the at least one aperture associated with each of these connection interfaces allows lifting gas to move between envelope segments. Movement of lifting gas between segments facilitates lifting gas pressure equilibrium between envelope segments throughout the envelope's compression and decompression phases. A related embodiment of the elevation control system presents rapid connection interfaces (not pictured) between envelope segments to facilitate, among other benefits, modular assembly and reconfiguration of the envelope, addition or removal of envelope segments, and repair of the envelope. Such a rapid connection interface allows these assembly, reconfiguration, and repair processes to be substantially performed in the field or in other situations that preclude access to specialized fabrication capabilities. Numerous options such as lightweight, externally bolted gastight flanges allow for such rapid gastight connection between two adjacent envelope segments and will be apparent to those of ordinary skill in the art.

Other simple embodiment envelopes of the elevation control system 10 may be fabricated from a single sheet of gastight material. The envelope 51 schematically shown in FIG. 7A is fabricated from a substantially rectangular sheet of gastight film that is rolled to form a cylinder with meridional seal 57 and sealed polar extremities 29 and 30 to provide a substantially gastight envelope 51. Polar rings 59 are positioned external to the envelope 51 at axial intervals of the envelope 51 to introduce a segmented envelope configuration to facilitate accordion-like compression and distension of envelope 51. Low fabrication cost is a benefit of the embodiment envelope 51. An array comprising a multitude of tendon 61, disposed meridionally along the full height of the envelope, and of functionality described earlier, can be superimposed external to envelope 51 and interior to the polar rings 59 to obtain higher burst pressure strength of envelope 51. Such an array of full envelope-height meridional tendons can be applied to many other embodiments of the current invention.

Figure 7B:
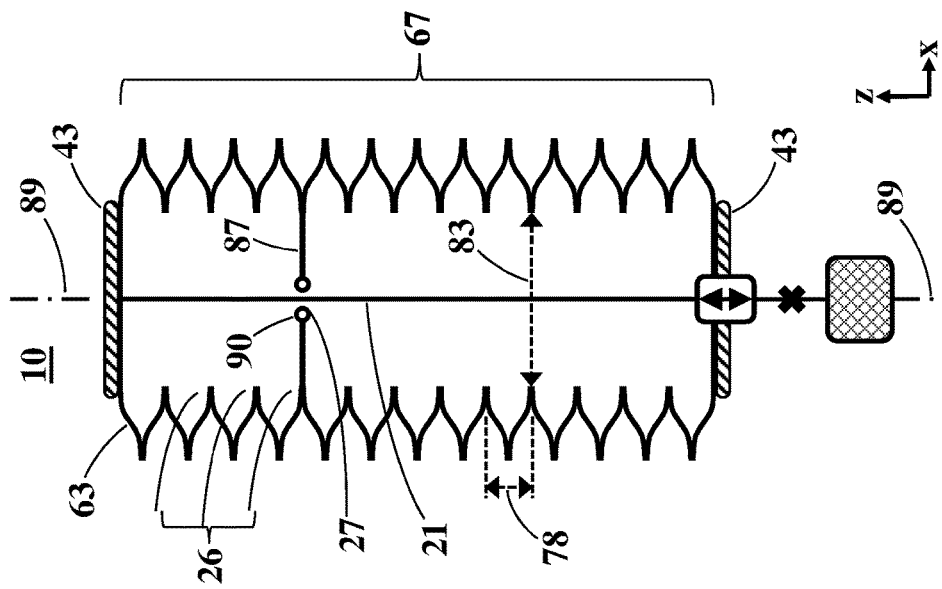
FIG. 7B is a simplified cross-sectional diagram showing a bellows-like embodiment of the envelope of the elevation control system.
Figure 7A:
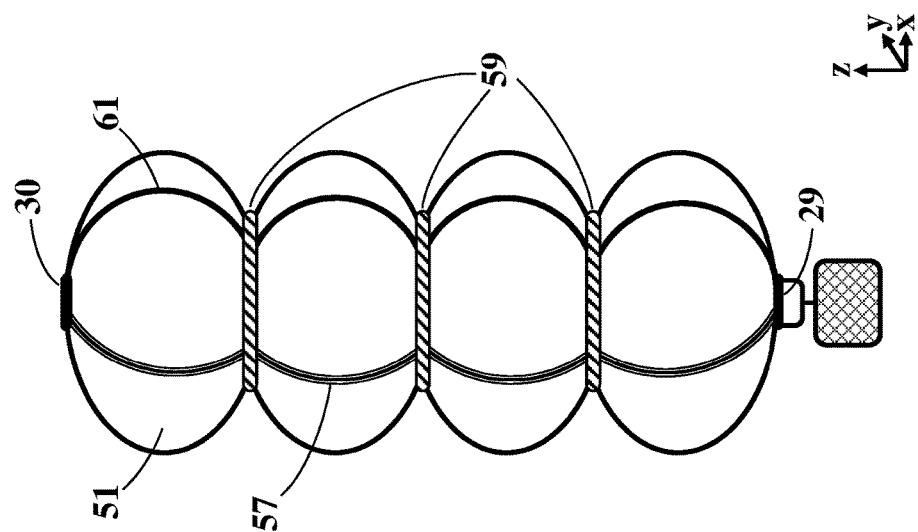
FIG. 7A is a simplified exterior view of a cylindrically fabricated embodiment of the envelope of the elevation control system.

Yet another embodiment envelope of the elevation control system 10 is schematically shown in FIG. 7B. Relative to earlier described embodiment envelopes, the bellows-like envelope 63 shown in FIG. 7B features a relatively large number of segments whereby each segment 67 displays a relatively small axial length 78 and a relatively large diameter interface 83 connecting successive segments. The bellows shape of the envelope 63 can be referred to as a vertically plated structure similar to the bellows of an accordion. The bellows shape of the envelope 63 can include a relatively rigid yet bendable segment 67 material. The relatively inflexible material of the corrugated segments 67 can form of a vertical expansion joint having abrupt terminal joints between segments 67 allowing for expansion and axial movement along and about a center axis 89 thereof. The various segments 67 can form a substantially flat pancake layered shaped when collapsed, originally manufacture, or compressed. Upon expanding the envelope 63 can form the bellows shape illustrated in FIG. 7B.

Envelope 63 can obtain a large volumetric compression ratio with diminished envelope 63 surface area, especially when incorporating a planar compression member 43. Envelope 63 accommodates incorporation of relatively inflexible gastight envelope materials such as thin-gauge metal sheet. Such a metal bellows-type envelope for elevation control system 10 is well-suited for operation in hostile environments such as the high-temperature acidic lower reaches of the Venusian atmosphere. The connection interface 26 between successive segments 67 can be structurally reinforced to add pressure restraining strength to envelope 63. One or more of interface 87 with aperture 27 provides a means to align tension cable 21 with the central axis 89 of the envelope 63. Accurate axial alignment ensures maintenance of a linear path of tension cable 21 which in turn ensures uniform compression and distension of the assembly of envelope segments 67. To facilitate such linear axial alignment of tension cable 21, aperture 27 of interface 87 is aligned to be concentric to the central axis 89 of the envelope 63. Embodiment interface 87 is aligned substantially perpendicular to central axis 89 and can take many forms. For example, one embodiment interface 87 can be a planar surface with aperture 27. A different, very lightweight, embodiment interface 87 can simply comprise a ring 90 through which tension cable 21 is free to move and whereby alignment of the ring 90 concentric to the central axis of the envelope 63 can be maintained by three or more linear elements connecting ring 90 to the connection interface 26 between successive envelope segments 67.

Once again referring to FIGS. 1A, 1B, 2A, and 2B, assuming now in another embodiment case that envelope 13 of balloon 11 and envelope 14 of balloon 12 have the same volume when fully distended, it follows that the average diameter of the segments 18 of balloon 12 will be smaller than the average diameter of envelope segments 17 of balloon 11. In such an embodiment, the tension cable force needed to maintain a same pressurization in both balloons 11 and 12 will be less for balloon 12, somewhat analogously to a hand pump advantageously employing a smaller diameter cylinder and piston to reduce the force of compression required by the pump operator. While the length of tension cable adjustment needed to effect a same change in envelope pressurization is greater for balloon 12 than it is for balloon 11, the reduced force needed by motor 20 to achieve such a same pressure change allows balloon 12 to take advantage of a lighter weight motor 20. The force to pressurize the envelope can further be reduced by passing the tension cable through one or more pulleys (not shown) to achieve mechanical advantage. Many motor types and systems of gearing are applicable and can be tailored very specifically to application requirements. An embodiment elevation control system may favor incorporation of a stepper motor of the type well-known to be simple, reliable, efficient, and adaptable to both very high temperature environments as well as cryogenic environments. Existing commercial stepper designs have been qualified for temperature environments ranging from −269° C. in a Helium lifting gas environment to +300° C., Radiation resistance up to $10^6$ J/kg, ultra-high vacuum applications up to $10^{-11}$ mbar, and high shock and vibration loads—making them imminently suitable for Titan and Venus atmospheric conditions. The mechanical simplicity of a stepper motor can result in electrical efficiencies well over 90%. Commercially available high power stepper motors offer exceptional torque of, for example 50 Nm, prior to additional gearing advantage. Another embodiment may prioritize a motor offering light weight, low cost, and associated with a large commercially available selection of options and accessories for power supplies, control systems, mounting configurations and hardware, and gearing. These prerequisites may lead to choice of a geared servo motor being a light weight, yet robust, temperature insensitive, rotation positional, and accurate motor. Many servo motors weigh less than 10 grams at a cost of less than 10 US Dollars.

A further attribute associated with a smaller envelope diameter is the potential for increased rate of ascent and descent as a result of the reduced drag on such an embodiment elevation control system as it travels through its surroundings. In this regard, a lower aspect ratio (i.e. low ratio of diameter to overall length of the primary axis) envelope embodiment will offer greater speed of ascent and descent. Higher speed mobility between different elevations of a craft incorporating such a control system further enhances the prospects of the craft's controlled lateral mobility by allowing the craft incorporating the current invention's elevation control system to rapidly take advantage of favorable winds or currents found at different elevations. Such lateral control can be a key asset in maintenance of a craft's position relative to a location of latitude and longitude, as well as relative to other craft (i.e. station keeping).

Figure 8B:
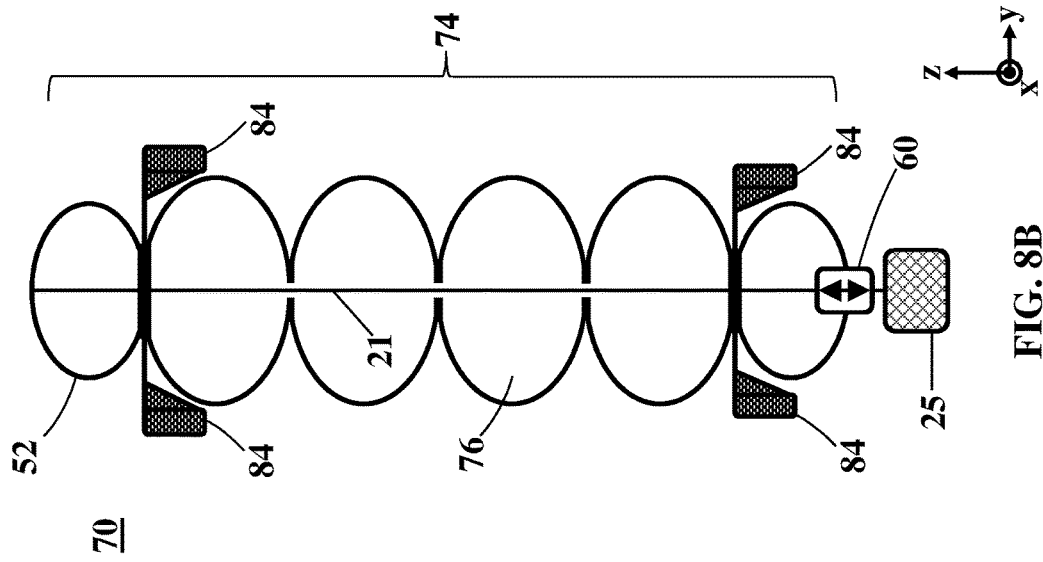
FIG. 8B is a simplified diagram showing a side view of the embodiment shown in FIG. 8A.
Figure 8A:
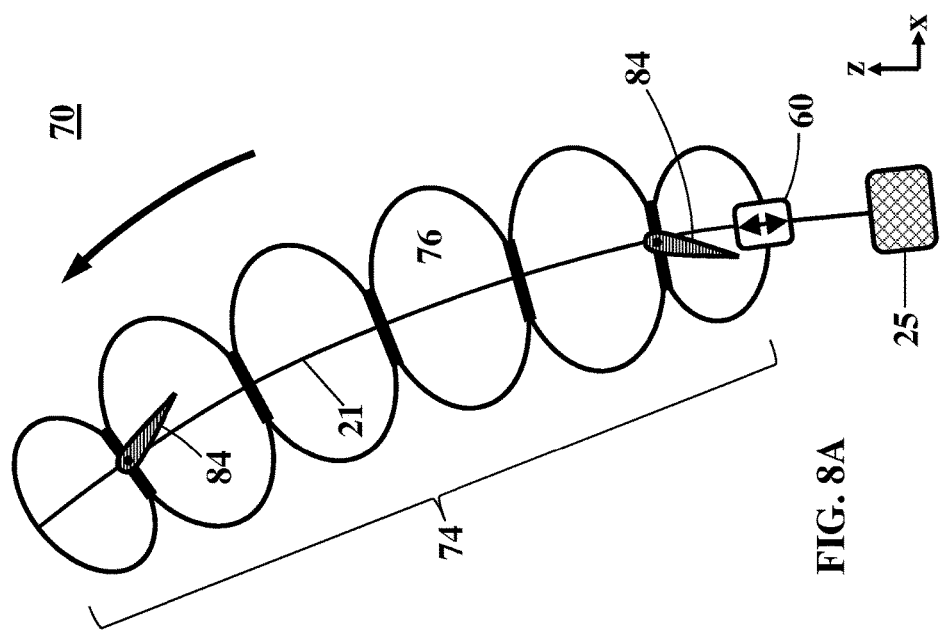
FIG. 8A is a simplified diagram showing an embodiment providing lateral mobility the elevation control system.
Figure 8D:
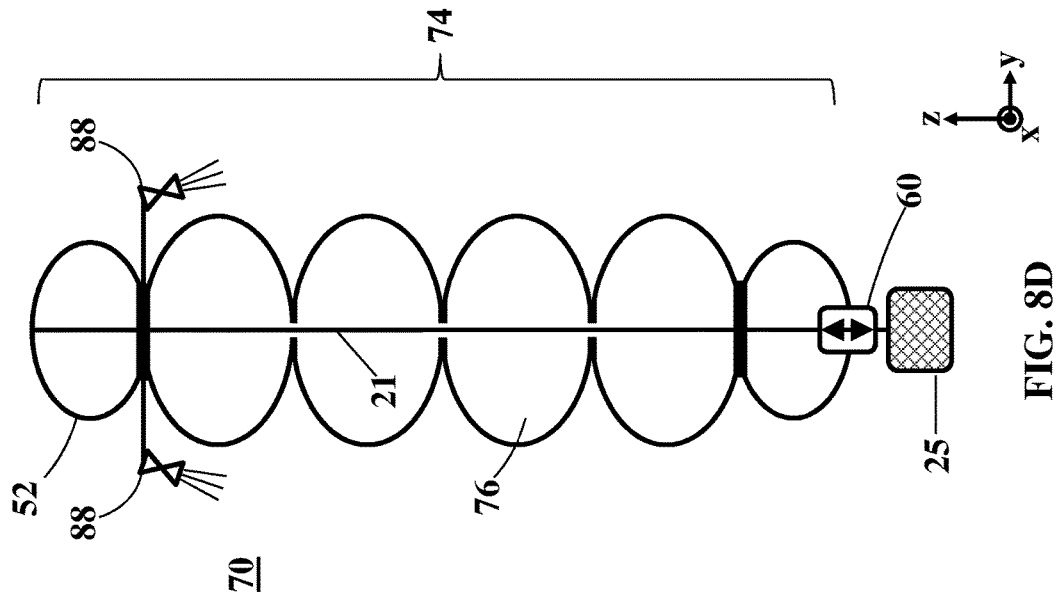
FIG. 8D is a simplified diagram showing a side view of the embodiment shown in FIG. 8C.
Figure 8C:
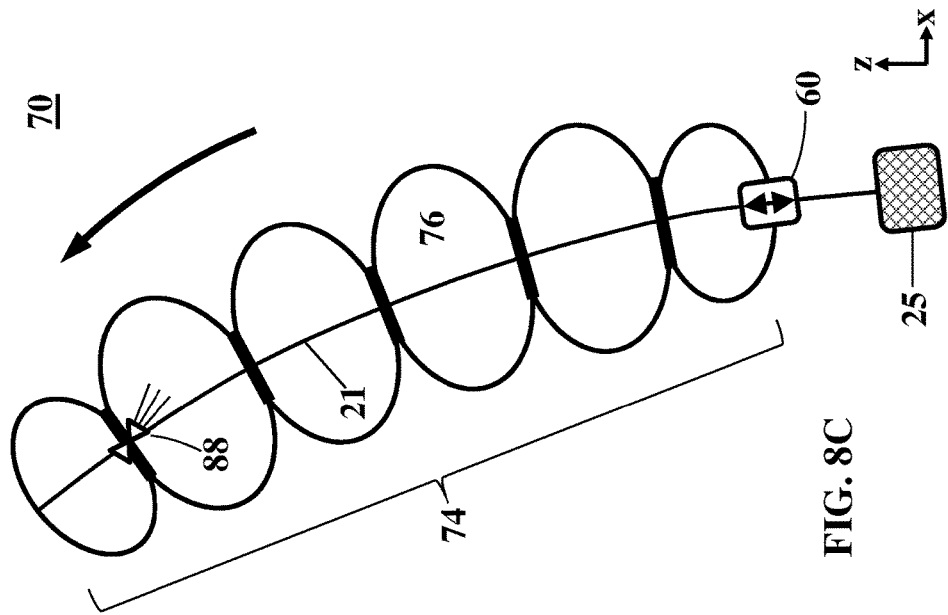
FIG. 8C is a simplified diagram showing an embodiment using propulsion to provide lateral mobility the elevation control system.

In other embodiments, ascent and descent velocity can be used to provide lateral mobility by dynamically deflecting the trajectory of a craft incorporating the current invention's elevation control system from its otherwise substantially vertical travel path. As schematically shown in FIGS. 8A and 8B, wing-like appendages 84 are attached to the envelope 74 containing the lifting gas 76 of the elevation control system 70. The appendages 84 function in similar fashion to diving planes found on submarines that are customarily installed as a pair near the vessel's bow and a pair aft. Diving planes, also known as hydroplanes, are control surfaces which allow the submarine to pitch its bow and stern up or down to assist in the process of submerging or surfacing the vessel, as well as controlling its depth when submerged. As the elevation control system 70 ascends or descends, implementation of the wing-like appendages 84 as shown in FIGS. 8A and 8B, causes lateral deflection in the direction of the arrow arc, away from the otherwise nominally vertical trajectory of the system 70. The appendages 84 can be located at any location on the exterior of the system 70, including on the payload 25, as to best address requirements. The appendages 84 can be of fixed orientation, for example to be used as vanes to help maintain particular directional behavior, or the appendages 84 can function as adjustably orientable control surfaces. The wing-like appendages 84 of the example embodiment can also be configured or controlled to cause the elevation control system 70 to rotate about its primary axis, thereby for example, orienting the system's lateral displacement most favorably. As schematically shown in FIGS. 8C and 8D, yet other embodiments of the elevation control system 70 may incorporate one or more, fixed or orientable, propulsion elements 88 to provide the system with lateral mobility, taking advantage of the low drag and axial flexibility of the segmented envelope 74. The propulsion elements 88 can be located at any location on the exterior of the system 70 to best address requirements. The control of the appendages and/or propulsion elements can be pre-programed, remotely controlled, adaptable, and fully or semi-autonomous.

Numerous other embodiments are readily implemented that take advantage of the adaptability of the elevation control system design. Depending on application and operational environment, the envelope can be fabricated using suitable materials of many types, and using methods such as technical fabric sewing and polymer film sealing, chemical and heat fusion, and bonding that are well known to those familiar with the art. For example, high specific strength, high inflation gas barrier laminates including materials such as MYLAR®, NYLON®, metallocene polyethylene, ethylene vinyl alcohol, the like, or others, may be used for terrestrial atmosphere applications. Reflective or conductive fabrics and films may be used by embodiments to assist in absorptive control of heat, electrical, and other forms of radiation, particularly at high terrestrial altitudes or in the atmospheres of other celestial bodies. Envelopes destined for particularly hostile atmospheric environments may require application of polyimide film such as Kapton®, or fluoropolymer envelope films, or the metallic envelope described earlier. Conversely, in the relative absence of the severe weight restriction associated with balloons, much heavier and robust bladder fabrics are advantageous for undersea applications due to the more powerful mechanical effects of the liquid medium. Envelopes for an undersea elevation control embodiment may therefore be fabricated using laminated fabrics comprising urethanes, polyvinyl chloride (PVC), and the like, further potentially reinforced with fibers or tendons such as glass, aramids such as Kevlar®, or ultra-high-molecular-weight polyethylene such Dyneema®, or a liquid crystal polymer such as Vectran®.

Embodiment envelope materials may be as diverse as complex fluoropolymer film coated laminates to resist damage from sulphuric acid clouds in the Venus atmosphere, or the envelope can be fabricated from annealed stainless steel foil to withstand great heat, or from yet other materials adapted to the cryogenic atmosphere of Saturn's moon Titan. A further benefit of the application of the present invention to planetary exploration involving cryogenic environments is that helium loss from an embodiment balloon envelope via gas diffusion would be very low since gas diffusion theory through a membrane predicts helium permeability is approximately four orders of magnitude lower at a temperature 90 K than at 300 K. Furthermore, significant increases in fiber specific strength is observed in polymers such as Spectra®, Dyneema®, and Vectran®. These polymers are primary candidates for the embodiment reinforcing tendons 79 described above and shown in FIG. 6D.

Figure 9B:
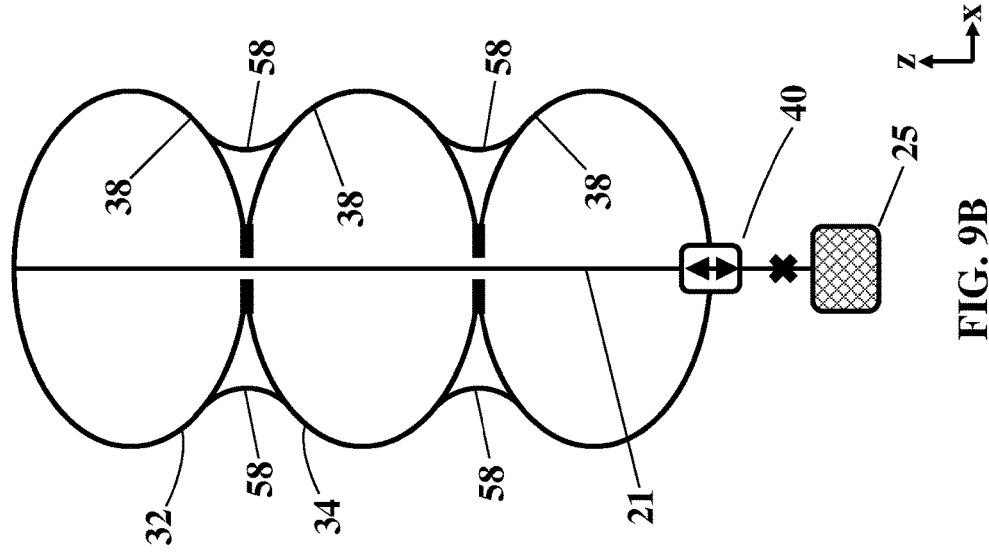
FIG. 9B is a simplified diagram showing an embodiment with features to protect from atmospheric condensation and/or icing.
Figure 9A:
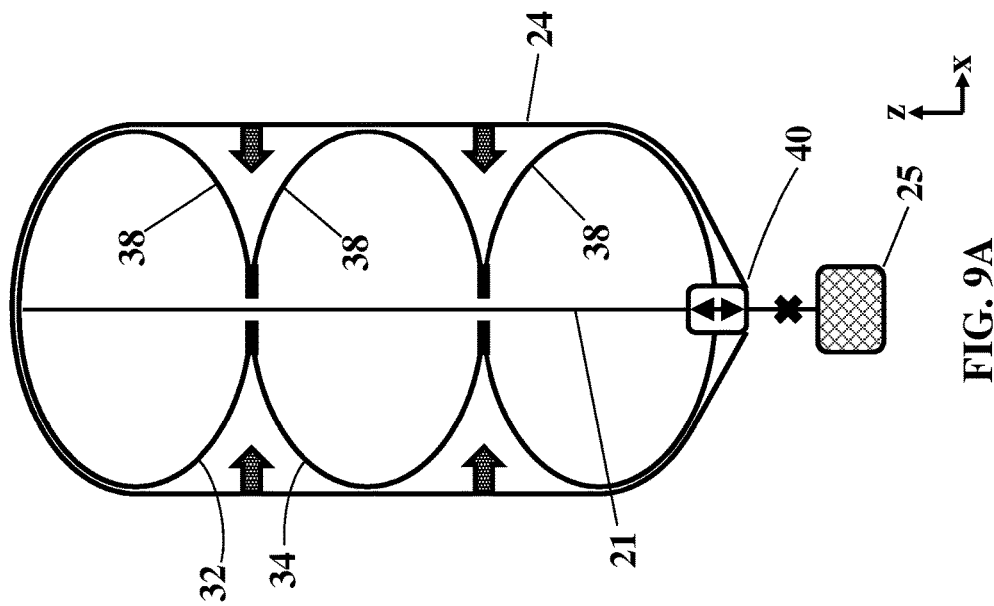
FIG. 9A is a simplified diagram showing an embodiment with an environmental protection cover.

FIG. 9A schematically shows an embodiment of an elevation control system that can also be shielded from hazardous and inclement environments through incorporation of a suitably protective exterior sleeve 24. Additional tailoring of the sleeve 24 to the shape of the expanding and contracting envelope 34 can be achieved with lightweight circumferential elastic in locations indicated by arrow. Fluoropolymer and other hydrophobic coatings can help shed precipitation and ice from meteorological balloon embodiments of the current invention. In another embodiment applicable to meteorological balloons and shown schematically in FIG. 9B, web-like gussets 58 between envelope segments 38, and surrounding the connection interfaces between segments 38, can help reduce icing around these interfaces. Such embodiments can singly, or in a balloon embodiment swarm, be applied to storm tracking and the scientific study of hurricanes and other weather phenomena. Significant benefit of the current invention in this regard is its low cost relative to other motorized unmanned aerial vehicles (UAV's), long duration deployment, deployment ground level or from a wide range of aircraft and altitudes, great elevation range, and potentially high ascent and descent rate allowing rapid positioning.

Since the potential applications for the altitude control system are very diverse, use can be made of a large range of lifting gases. Helium and Hydrogen are generally primary candidates for lifting gas due to their low densities: At 0 degrees C. and 101.325 kPa pressure, Hydrogen density is 0.08988 grams/liter and Helium density 0.1786 grams/liter. The buoyancy of an embodiment terrestrial atmospheric craft incorporating the present invention's elevation control system would benefit greatly from using Hydrogen or Helium lifting gas to juxtapose with the 1.2922 grams/liter density of the surrounding air at same temperature and pressure. An example undersea embodiment may simply use air as lifting gas due to the immense density difference between air and the liquid aqueous environment.

Titan, the largest moon of planet Saturn, is the only natural satellite known to have a dense atmosphere, and the only object other than Earth where clear evidence of stable bodies of surface liquid has been found. Titan presents exceptional buoyancy due to its commensurately high atmospheric density of 5.4 kg/m$^3$ near its surface, versus Earth's 1.29 kg/m$^3$. Even at 8 km altitude in the Titan atmosphere, one cubic meter of Helium lifting gas can float approximately 4 kg of altitude control craft system mas. Titan is therefore a highly applicable destination for different embodiment elevation control systems, whether atmospheric or submerged.

An embodiment cloud level balloon at Venus can use Helium due to the additional safety benefit of chemical inertness for space mission application. For another Venus balloon embodiment, the Helium lifting gas can be combined with water within the balloon envelope. As a so-called "reversible fluid", water condenses into liquid at the cold higher Venus altitudes, thereby leading to the balloon's descent. As the embodiment balloon descends through the increasingly hot, lower altitudes, the water would begin to boil, transitioning from liquid to vapor phase. As a result, the balloon's volume increases, and the balloon's descent is arrested with subsequent return to an ascending trajectory. Depending on the combination of environmental parameters such as temperature, and mission requirements such as desired altitude range and transition time between ascent and descent, another embodiment can only employ ammonia as lifting gas; or yet another embodiment can add ammonia to the Helium and water combination to provide a more variable temperature liquid-vapor phase transition than would be the case with water or ammonia alone. This type of reversible fluid buoyancy control can be implemented to introduce a level of elevation control autonomy to any embodiment. Reversible fluid embodiments can provide passive protection by preventing the embodiment elevation control craft from accidentally exceeding minimum and maximum elevations. This attribute may be especially advantageous for space missions that require significant time to relay communication commands across space. Based on this time delay of communication, a controller of the passive system can also compensate for unanticipated environmental changes to maintain the previously programmed settings with regards to internal pressure to maintain the liquid-vapor phase transition at a particular elevation, or range of elevations. A further benefit of the phase change lifting gas embodiments of the current invention is the ability to optimize the ratio of envelope volume to surface area to tailor condensation and evaporation rates for the desired ascent/descent transition control of the craft during lifting gas phase change.

Figure 10:
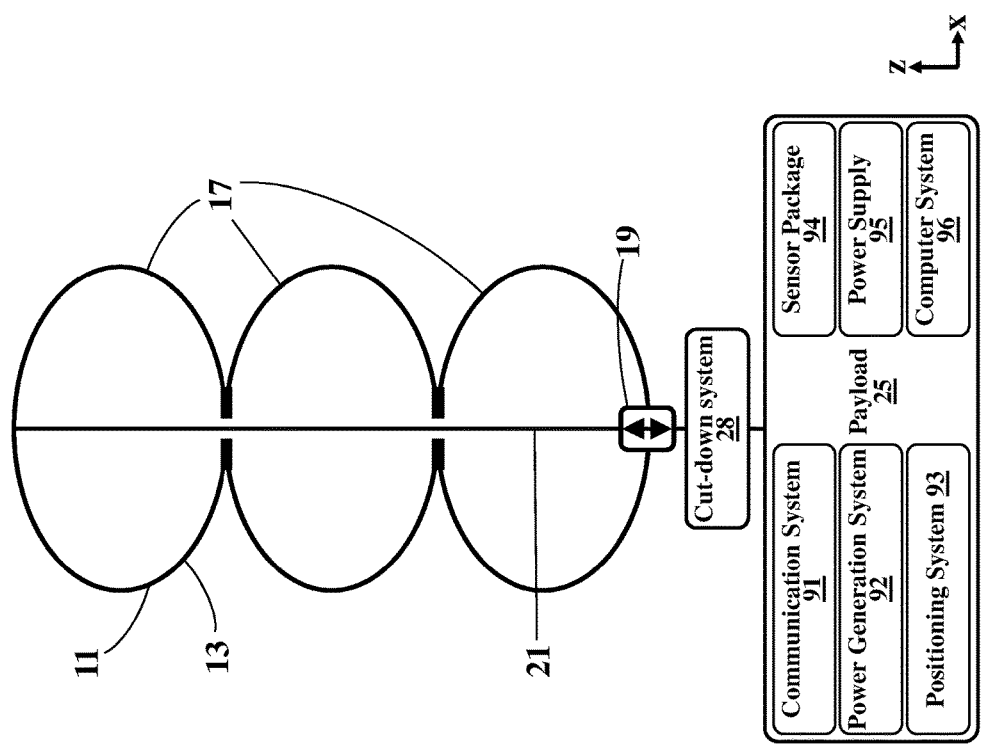
FIG. 10 is a simplified block diagram illustrating an elevation control system, according to an example embodiment.

Referring to FIG. 10, an example of a payload 25 of the elevation control system may include many elements such as scientific instruments, cameras, cargo, or passengers. The payload 25 can include sub-compartments and multiple payloads for specific purposes. The payload 25 may include a power supply 95 to provide power for operation of the elevation control system. The power supply 95 may include batteries, rechargeable or otherwise. In other embodiments, the power supply 95 may include a power generation system 92 for producing power, for example through incorporation of solar panels that generate power to charge the power supply 95. For embodiments of the present invention intended to functioning as elevation control system for a planetary probe, nuclear power enables missions where sunlight is infrequent, obscured, or dimmed by distance, making solar power impractical. Radioisotope Power Systems (RPS) use heat from the natural decay of plutonium-238. RPS units are ideally suited to provide electrical power for missions involving autonomous, long-duration operations in the most extreme cold, dusty, dark and high-radiation environments found in space and on planetary surfaces.

Other payload items may include positioning 93 and sensor packages 94, navigation and safety equipment, as well as computer system 96, modem, software, and memory. Many such items may function to control the motion of the elevation control system and of craft incorporating such an elevation control system. Onboard sensor packages 94 for spatial position, temperature, humidity, pressure, altitude, climb rate, tension cable load, motor speed, and the like, directly support operation of an embodiment onboard control system. Tension cable load is a control tool and diagnostic element to optimize functioning of an embodiment elevation control system wherein cable load and envelope pressure are correlated in a closed loop control system with motor speed, cable retraction/extension speed, and system ascent and descent rate. The payload may also include radio frequency, optical, laser, and other communication system 91 equipment to relay data, or to permit remote operation of the elevation control system. Onboard sensor packages 94, data acquisition systems, and controllers can allow certain embodiment elevation control systems to perform autonomously or semi-autonomously. In particular, on-board systems can be configured to receive detailed atmospheric data whereupon the on-board computer of an embodiment altitude control system applies control algorithms thereby manipulating the craft's altitude to take advantage of altitude-variable wind directions and speeds, to in-turn facilitate the craft's lateral mobility in accordance with a preferred trajectory. The aforementioned control algorithm can alternately be transmitted to an embodiment altitude control system. A payload including sophisticated imaging equipment such as optical cameras, hyperspectral image sensors, or synthetic aperture radar (SAR), combined with data acquisition and transmission capability, constitutes an embodiment imminently suitable for surveillance. Onboard communication systems 96 may also contribute to the operation of a network of altitude control systems. Whether as a network or singly, different elevation control system embodiments can be purposed as interfaces between ground stations, aircraft or other vehicles, or space-based satellites, to act as relay for diverse communication applications including cellular and internet service.

For many of the terrestrial applications mentioned above, particularly for communications and surveillance, the embodiment elevation control systems will find advantage in operating in the stratosphere. At moderate latitudes the stratosphere is situated between about 10 and 13 km (33,000-43,000 ft; 6.2-8.1 mi) and 50 km (160,000 ft; 31 mi) altitude above the surface, while at the poles it starts at about 8 km (26,000 ft; 5.0 mi) altitude, and near the equator it may start at altitudes as high as 18 km (59,000 ft; 11 mi). The region between 16 km and 24 km is of particular suitability for the above embodiment systems: Interference with commercial aviation that is generally restricted to altitudes below 16 km is avoided, and wind speeds in the stratospheric region are generally a relatively low 10 to 30 km/h with low turbulence and considerable predictability. Beyond more conventional commercial application, embodiment elevation control systems are suitable for humanitarian application and disaster relief, deploying rapidly to provide persistent emergency communication and internet connection.

Figure 11:
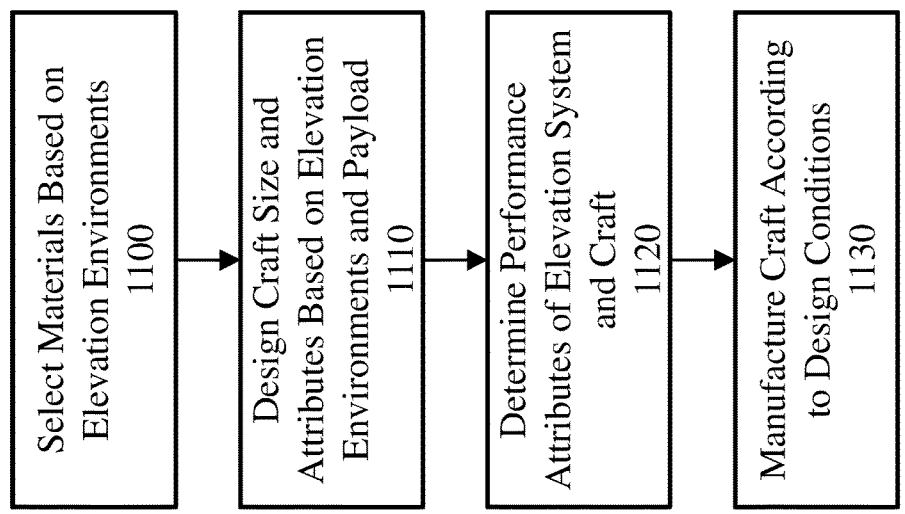
FIG. 11 illustrates design and manufacture criteria method according to several embodiments and aspects discussed herein.

FIG. 11 illustrates a method for designing and/or manufacturing an elevation control system. The elevation control system can be the same or similar to the embodiments disclosed herein or related to other crafts and elevation control systems.

The materials of various components of the elevation control system can be selected (1100). The materials of the elevation control system can be selected based on an environment of which they are to be used. For example, and elevation at which the elevation control system is designed to operate can affect the material selection. The temperature, or temperature range, of the environment in which the elevation control system is designed to operate can be used to determined material selection and attributes thereof. The material of the balloon can be selected and/or manufactured based on the environment and application specific requirements including elevation control parameters. The material of the tension cable can be selected based on the environment and application specific requirements thereof.

The material selection (1100) can vary between portions of the elevation control system. For example, the material attributes can vary between envelope segments. The material selection can vary according to the external environment, wear aspects, safety concerns, and weight reduction design.

Selection of attributes of the craft and elevation control system can vary based on size parameters (1110). The size parameters of which the design and manufacture are related can consider a payload weight, an altitude of the application of use of the craft, a duration of use, a size of a thermal or solar power feature, a size of a carrying vehicle, or other size-related consideration.

The design and performance of the craft and elevation control system can consider performance attributes (1120) in manufacture and/or design thereof. The performance attributes can include the need to quickly change altitude or directionally navigate in wind currents. The design and performance considerations can include modularity, recyclability, data communication, planetary considerations, space travel limitations, and underwater constraints.

And, the manufacture of the craft, elevation control system, and/or components can take into any or all of these parameters mentioned herein as well as others (1130).

Figure 12:
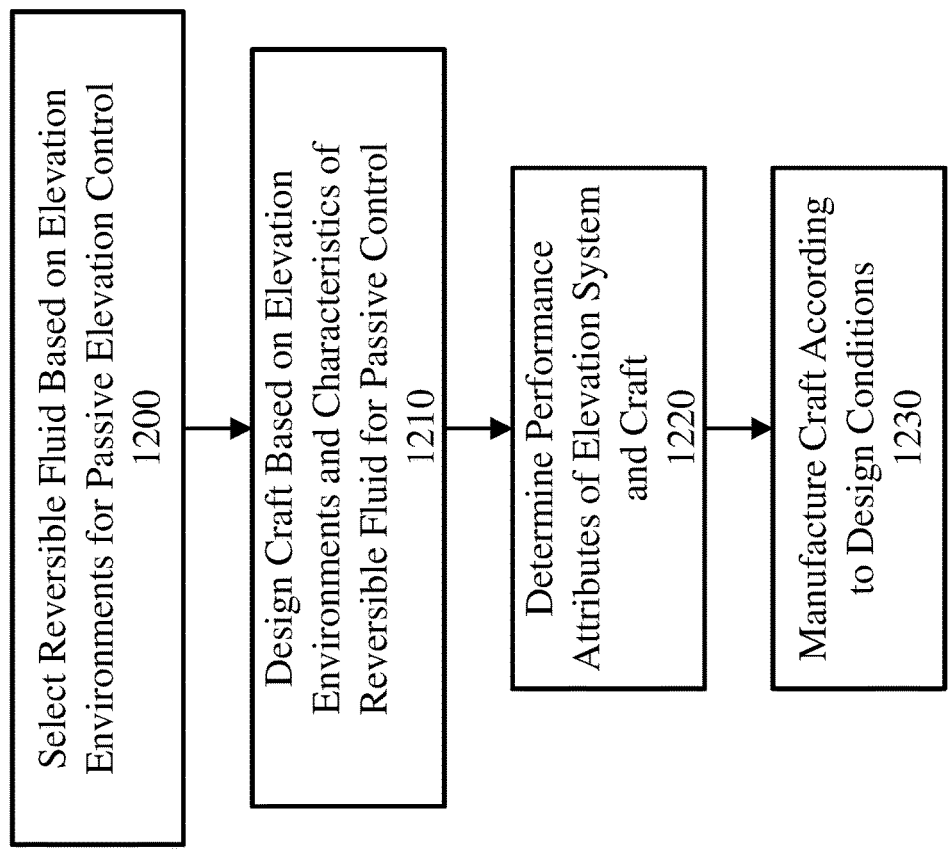
FIG. 12 illustrates a method of passive elevation control.

FIG. 12 illustrates a method of passive elevation control. The method can be used in the design and operation of the various systems of buoyancy control discussed herein. A method of passive elevation control of a buoyant craft can include selecting a reversible fluid for the buoyant craft (1200). The reversible fluid can have a phase characteristic based on an environment within which the buoyant craft is designed to maintain a passive elevation. Maintenance of the passive elevation of the craft in the environment is due to the transition characteristics of the reversible fluid between a liquid and vapor phase.

The passive elevation control of the buoyant craft defines a maximum and/or minimum elevation within the atmosphere of the environment based on a temperature and pressure of the atmosphere of the environment compared to the transition characteristics of the reversible fluid between the liquid and vapor phase. For example, where the phase of the fluid reverses at particular temperature and pressure correlation, that correlation can be used to define an elevation within an atmosphere where conditions of this phase change are met.

Moreover, the craft can be designed based on the reversible fluid's characteristics (1210). For example, the envelope within which the reversible fluid is held along with other lifting gas according to several embodiments can be selected based on a size, temperature, and pressure attribute at which the reversible fluid transitions between a liquid and vapor phase.

In some embodiments, the performance attributes of the elevation system and craft can be determined based on the passive elevation control attributes of the reversible fluid (1220). For example, the craft can be designed to operate substantially above the temperature and pressure associated with a transition elevation of the reversible fluid. In such instance, the reversible fluid's transition from the liquid phase to the vapor stage can be used as a minimum passive elevation control. As previously discussed this minimum elevation passive control can be used as a fail-safe measure in the instance that the craft is used in a remote atmosphere. Similarly, the craft can be designed to operate substantially below the transition elevation where the temperature and pressure of the reversible fluid transitions from the liquid phase to the gaseous phase. In some embodiments, a range of elevations for passive control of a maximum and minimum passive control by the characteristics of the reversible fluid can be defined.

The craft can also include programing including algorithms that are maintained to monitor the conditions within which the phase transition of the reversible liquid occurs. And, in certain circumstances the elevation control including internal pressure and compression of the envelope can be controlled in order to introduce or prevent transition of the reversible fluid. The environment is the atmosphere of Venus and the reversible fluid is selected based on a range of temperatures and atmospheric pressures of Venus at a predetermined range of maximum and/or minimum surface elevations. Thus, the craft can be manufactured according to the design considerations related to the reversible fluid as well as the ambient environment within which the craft is designed to operate such that the craft incorporates passive elevation control (1230).

As previously discussed, the elevation control system can include a computing device, such as a data processor. Components of the computing device may include, but are not limited to, a processing unit, a system memory, and a system bus that couples various system components including the system memory to the processing unit.

The elevation control system can include a variety of computer-readable media and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices including a connection thereto, or any other medium which can be used to store the desired information and which can accessed by the computer. The elevation control system (or a payload subcomponent) can include a transferrable computer-readable media.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. The elevation control system may operate in a networked environment using logical connections or data links to hubs or extenders which can act in concert with other crafts including other elevation control systems.

Various elevation control systems and devices therein can include means for performing the various functions. Such means when thereby termed includes the structures and combinations therefor as well as comparable structures. Certain devices may be described as including structures for streaming data, displaying data, controlling other devices and/or cooperating with various other devices. Combinations of structure means may not be necessary, however, to achieve such functions. Means for elevation control can include any or all of the structures illustrated in the figures. And, steps for accomplishing a function can further include any or all of the steps and corresponding features of those functions as disclosed herein.

Embodiments within the scope of the present invention also include computer-readable media for carrying or having computer-executable instructions or data structures stored thereon including storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

It is clear that attributes of the herein described embodiments can be juxtaposed and optimized in accordance with the requirements associated with particular applications. The current invention is thereby adaptable to operation in a broad range of fluid environments, whether terrestrial, or at celestial bodies harboring atmospheric or liquid environments.

Although various embodiments have been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The foregoing description of the specific embodiments reveals the general nature of the technology sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A system including direct compression buoyancy control, the system comprising:
    a substantially gas-tight envelope including a plurality of successive envelope segments in fluid communication with one another;
    lifting gas contained within the substantially gas-tight envelope;
    a tension cable connecting at least two of the envelope segments;
    a buoyancy control device configured to adjust the tension cable thereby altering compression of the lifting gas within the substantially gas-tight envelope to control buoyancy of the system; and
    a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments.

2. The system according to claim 1, the buoyancy control device configured to adjust a length of the tension cable between the at least two envelope segments to change a buoyant altitude of the system.

3. The system according to claim 1, the substantially gas-tight envelope being made of a substantially inextensible material.

4. The system according to claim 1, wherein the successive envelope segments are arranged in a column of segments capable of an accordion-like collapse under axial compression.

5. The system according to claim 1, wherein circumferential constriction members apply constriction to the envelope to shape the successive envelope segments.

6. The system according to claim 1, wherein the gas-tight envelope includes a single envelope sheet of gas-tight material with a meridional seal.

7. The system according to claim 1, further comprising an array of multiple tendons disposed meridionally along a height of the envelope.

8. The system according to claim 1, wherein the plurality of successive envelope segments include a lifting gas aperture for lifting gas to flow from one envelope segment to an adjacent envelope segment by the lifting gas aperture.

9. The system according to claim 1, further comprising a connection interface connecting one of the plurality of successive envelope segments with an adjacent envelope segment and including the tension cable aperture.

10. The system according to claim 1, wherein the tension cable is positioned inside the envelope and a first end of the tension cable is attached to an internal apex of an envelope segment and extends through the tension cable aperture.

11. The system according to claim 1, further comprising:
a plurality of lifting gas apertures, the lifting gas apertures being larger than the tension cable aperture to permit rapid passage of lifting gas between adjacent envelope segments.

12. The system according to claim 1, further comprising a first inflexible compression member increasing a compression ratio of the gas-tight envelope to more efficiently collapse and compress the segmented envelope.

13. The system according to claim 12, further comprising a second inflexible compression member increasing a compression ratio of the gas-tight envelope, the tension cable internal to the envelope and connects the first inflexible compression member to the second inflexible compression member.

14. The system according to claim 1, wherein the buoyancy control device includes a tension cable setting for neutral buoyancy, a setting for negative buoyancy, and a setting for positive buoyancy.

15. The system according to claim 14, wherein the neutral, negative, and positive buoyancy settings include a tension cable load setting, relative pressure setting, and/or tension cable length setting.

16. The system according to claim 14, wherein the tension cable setting for neutral, negative, and positive buoyancy is associated with an elevation.

17. The system according to claim 16, wherein the tension cable setting for neutral, negative, and positive buoyancy is configured to be actively recorded or updated by the system as the system ascends, descends, or maintains a buoyant position at the elevation.

18. The system according to claim 1, further comprising:
an obstruction mass, the obstruction mass creating an obstruction at a particular location of the gas-tight envelope to prevent or resist the particular location of the segmented envelope from collapsing.

19. The system according to claim 1, further comprising a motor for decreasing the length of the cable in order to increase compression of the lifting gas and decrease the buoyancy of the system.

20. The system according to claim 1, wherein the lifting gas includes ammonium.

21. The system according to claim 13, wherein the first and second inflexible compression members substantially collapse the gas-tight envelope when the gas-tight envelope is fully compressed by the compression members.

22. The system according to claim 1, further comprising:
a first inflexible compression member increasing a compression ratio of the gas-tight envelope to more efficiently collapse and compress the gas-tight envelope, wherein the first inflexible compression member includes a conical or tapered side for supplying a uniform loading to the gas-tight envelope.

23. The system according to claim 14, wherein each of the tension cable settings defines a distance between opposing polar apices of two envelope segments.

24. The system according to claim 18, wherein the obstruction mass includes a stopper attached to the tension cable, wherein the tension cable is disposed internal to the segmented envelope and the stopper is sufficiently sized to preclude passage of the stopper through a tension cable aperture between adjacent segments of the envelope.

25. The system according to claim 24, wherein the obstruction mass includes a compression tube disposed around the tension cable within a segment of the envelope, the compression tube preventing or resisting compression of a portion of the gas-tight envelope.

26. The system according to claim 1, wherein the envelope includes a gas-tight metallic material.

27. The system according to claim 26, wherein the material of the envelope is resistant to a high-temperature and acidic environment of an atmosphere of a planet or moon remote to Earth.

28. The system according to claim 26, wherein the material of the envelope is resistant to a cryogenic temperature environment of an atmosphere of a planet or moon remote to Earth.

29. The system according to claim 27, wherein the planet or moon remote to Earth is Venus and the metallic material is resistant to the heat and acidity of the atmosphere of Venus.

30. The system according to claim 1, further comprising a motor, wherein the number of segments of the envelope are selected based on a desired altitude range of the system.

31. A method of manufacturing a system including direct compression buoyancy control, the method comprising:
providing a substantially gas-tight envelope including a plurality of successive envelope segments in fluid communication with one another;
providing lifting gas contained within the substantially gas-tight envelope;
providing a tension cable connecting at least two of the envelope segments;
providing a buoyancy control device;
providing a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments;
selecting a motor having a torque;

manufacturing the substantially gas-tight envelope including the plurality of successive envelope segments in fluid communication with one another, the number of segments of the envelope being selected based on the desired altitude range of the system;

assembling the envelope with the tension cable connecting at least two of the envelope segments; and assembling the buoyancy control device with the motor, the control device being configured to cause the motor to adjust the tension cable thereby altering compression of the lifting gas within the substantially gas-tight envelope to control the buoyancy of the system.

32. The system according to claim 1, the buoyancy control device configured for maintaining a controlled elevation change by adjusting tension cable load.

33. The system according to claim 1, the buoyancy control device configured for maintaining a controlled velocity of elevation change by adjusting tension cable load.

34. The system according to claim 1, the buoyancy control device configured for maintaining a controlled acceleration of elevation change by adjusting tension cable load.

35. The system according to claim 1, the buoyancy control device configured for maintaining a cable tension for a super-pressure of the lifting gas within the substantially gas-tight envelope to resist turbulent exterior environmental conditions.

36. The system according to claim 1, the buoyancy control device configured for maintaining a desired tension cable load by releasing additional length of tension cable during ascent.

37. The system according to claim 1, further comprising a motor for winding and unwinding the tension cable around a rotating shaft, the motor being controlled by the buoyancy control device to directly adjust the length of the tension cable thereby mechanically altering the compression of the lifting gas within the substantially gas-tight envelope.

38. The system according to claim 1, wherein the buoyancy control device is configured for controlling tension of the tension cable based on a sensed difference in pressure between the inside of the envelope and surrounding ambient environment.

39. The system according to claim 1, wherein the tension cable extends through the envelope between opposing polar apices of the envelope, and wherein tension in the tension cable decreases and increases a distance between opposing polar apex of the envelope to compress and decompress respectively the volume of lifting gas within the envelope.

40. The system according to claim 1, wherein the buoyancy control device includes buoyancy control settings associated with compression states of the lifting gas at different elevations.

41. The system according to claim 1, wherein the buoyancy control device includes executable instructions that when executed by a processor of the buoyancy control device cause a motor of the system to change a current tension cable setting associated with a first elevation to a stored tension cable setting associated with a second elevation.

42. The system according to claim 1, wherein the buoyancy control device includes executable instructions that when executed by a processor of the buoyancy control device cause a motor of the system to change a current tension cable setting associated with a neutral buoyancy lifting gas compression state to a stored tension cable setting associated with a negative buoyancy lifting gas compression state.

43. The system according to claim 1, wherein the buoyancy control device includes executable instructions that when executed by a processor of the buoyancy control device cause a motor of the system to change a current tension cable setting associated with a neutral buoyancy lifting gas compression state to a stored tension cable setting associated with a positive buoyancy lifting gas compression state.

44. The system according to claim 1, wherein the buoyancy control device includes executable instructions that when executed by a processor of the buoyancy control device cause a motor of the system to change a current tension cable setting corresponding to an over compression state greater than a neutral buoyancy compression state at a different elevation so as to more quickly move the system to the different elevation.

45. The system according to claim 1, wherein the buoyancy control device includes executable instructions that when executed by a processor of the buoyancy control device cause a motor of the system to change a current tension cable setting corresponding to an over decompression state lower than a neutral buoyancy compression state at a different elevation so as to more quickly move the system to the different elevation.

46. The system according to claim 1, wherein the system is configured to mechanically compress the envelope to approximately one-third its uncompressed volume.

47. The system according to claim 1, wherein the buoyancy control device includes a setting associating a buoyancy state with an amount of tension in the tension cable, length of tension cable, and/or a compression motor reel retraction position.

48. The system according to claim 1, further comprising a payload connected to the envelope.

49. The system according to claim 48, further comprising a cut-down system configured to separate the payload from the envelope.

50. The system according to claim 49, wherein the payload includes a memory device for recovering data recorded by the system.

51. The system according to claim 1, further comprising a tether coupled to the system, the tether coupling the system to ground.

52. The system according to claim 1, further comprising:
linear compression members positioned in an X-Z plane exhibiting a radial compression geometry in an associated Y-Z plane exhibiting a radial compression geometry of the gas-tight envelope's minimal volume.

53. The system according to claim 1, wherein the tension cable spans an exterior of the gas-tight envelope to connect at least two of the envelope segments.

54. The system according to claim 53, the system further including a plurality of additional tension cables spanning the exterior of the gas-tight envelope to maintain columnar alignment.

55. The system according to claim 54, wherein ends of first and second tension cables of the plurality of additional tension cables are connected to an upper envelope apex of the gas-tight envelope.

56. The system according to claim 54, wherein ends of first and second tension cables of the plurality of additional tension cables are connected to an intermediate location of the gas-tight envelope so as to compress a portion of the gas-tight envelope.

57. The system according to claim 1, wherein the gas-tight envelope includes a single envelope sheet of gas-tight material, the system further comprising a plurality of polar rings positioned external to the envelope and defining the successive segments of the envelope to promote compression of the envelope at axial intervals of the gas-tight envelope.

58. The system according to claim 57, further comprising an array of multiple tendons disposed meridionally along a height of the gas-tight envelope, the tendons being held between at least one polar ring and the gas-tight envelope.

59. The system according to claim 1, further comprising:
a stopper attached to the tension cable and disposed within a top segment of the gas-tight envelope; and
a compression tube disposed around the tension cable within a bottom segment of the gas-tight envelope, wherein the stopper prevents or resists the top segment of the gas-tight envelope from being fully collapsed and the compression tube prevents or resists the bottom segment of the gas-tight envelope from being fully collapsed.

60. The system according to claim 1, wherein the gas-tight envelope is comprised of a laminated material.

61. The system according to claim 1, wherein the gas-tight envelope including a plurality of successive balloon segments includes a heat-sealable polyethylene layer.

62. The system according to claim 1, further comprising flexible reinforcement fiber tendons disposed over one or more segments of the envelope.

63. The system according to claim 1, further comprising a pair of polar rings between which a meridional array of flexible reinforcement fiber tendons extend.

64. The system according to claim 1, the gas-tight envelope further comprising a connection interface between at least two adjacent segments of the envelope.

65. The system according to claim 1, wherein the successive envelope segments are bellows-shaped segments.

66. The system according to claim 65, wherein the bellows-shaped segments form substantially flat layers when the envelope is in a collapsed state.

67. The system according to claim 65, wherein the bellows-shaped segments form substantially pleated sidewalls when the envelope is in an expanded state.

68. A method of manufacturing a system including direct compression buoyancy control, the method comprising:
providing a substantially gas-tight envelope including a plurality of successive envelope segments in fluid communication with one another, wherein the envelope includes a plurality of bellows-shaped segments and the layers of the bellows-shaped segments form substantially pleated sidewalls when the envelope is in an expanded state;
providing lifting gas contained within the substantially gas-tight envelope;
providing a tension cable connecting at least two of the envelope segments;
providing a buoyancy control device;
providing a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments;
selecting a motor based on the number of envelope segments;
manufacturing the substantially gas-tight envelope including the plurality of successive envelope segments in fluid communication with one another;
assembling the envelope with the tension cable connecting at least two of the envelope segments;
assembling the buoyancy control device with the motor, the control device being configured to cause the motor to adjust the tension cable thereby altering compression of the lifting gas within the substantially gas-tight envelope to control the buoyancy of the system.

69. The system according to claim 1, further comprising a deflector for deflecting the horizontal trajectory of the system during a change in vertical position.

70. The system according to claim 69, wherein the deflector includes one or more appendages that are of fixed orientation or are adjustably orientable control surfaces.

71. The system according to claim 1, further comprising a propulsion element.

72. The system according to claim 71, wherein the propulsion element is configured to provide lateral mobility to the system.

73. The system according to claim 1, further comprising an exterior protective sleeve surrounding the gas-tight envelope.

74. The system according to claim 73, wherein the sleeve includes a hydrophobic surface coating to repel precipitation and ice.

75. The system according to claim 73, wherein the sleeve includes gussets between envelope segments.

76. The system according to claim 1, wherein the lifting gas includes helium.

77. The system according to claim 1, wherein the lifting gas includes hydrogen.

78. An airborne craft comprising the system according to claim 1 for direct compression buoyancy control in Earth's atmosphere, the buoyancy control device configured to adjust the tension cable thereby altering compression of the lifting gas within the substantially gas-tight envelope to control the buoyancy of the craft in air.

79. The airborne craft according to claim 78, wherein a material of the envelope includes nylon, polyethylene terephthalate, polyimide, metallocene polyethylene, and/or ethylene vinyl alcohol.

80. A remote planetary craft comprising the system according to claim 1 for direct compression buoyancy control in the atmosphere of a planet remote to Earth, the buoyancy control device configured to adjust the tension cable thereby altering compression of the lifting gas within the substantially gas-tight envelope to control the buoyancy of the craft in the atmosphere of the remote planet.

81. The remote planetary craft according to claim 80, when a material of the envelope includes a polyimide film and/or fluoropolymer film.

82. The remote planetary craft according to claim 80 for direct compression buoyancy control in the atmosphere of Venus, wherein the envelope includes an annealed metallic foil to resist damage from heat and acid in the Venus atmosphere.

83. The remote planetary craft according to claim 80 for direct compression buoyancy control in the atmosphere of Venus, further comprising a fluoropolymer exterior sleeve.

84. The remote planetary craft according to claim 80 for direct compression buoyancy control in the atmosphere of Venus, wherein the envelope includes a polyimide.

85. The remote planetary craft according to claim 80 for direct compression buoyancy control in the atmosphere of Saturn's moon Titan, wherein the envelope includes a fluoropolymer.

86. The remote planetary craft according to claim 80 for direct compression buoyancy control in the atmosphere of Saturn's moon Titan, wherein the envelope includes polyimide.

87. An underwater craft comprising the system according to claim 1 for underwater direct compression buoyancy control, the buoyancy control device configured to adjust the tension cable thereby altering compression of the lifting gas within the substantially gas-tight envelope to control the buoyancy of the craft under water.

88. The underwater craft according to claim 87, wherein a material of the envelope includes a laminated fabric including a urethane and/or polyvinyl chloride.

89. The underwater craft according to claim 87, further comprising a plurality of reinforcing tendons extending over the envelope.

90. The underwater craft according to claim 87, wherein the lifting gas includes air.

91. The system according to claim 1, further comprising a reversible fluid within the envelope, the reversible fluid selected to condense into a liquid at a cold higher altitude thereby leading to a lower system buoyancy.

92. The system according to claim 1, wherein the lifting gas includes water vapor.

93. The system according to claim 1, wherein the lifting gas includes ammonia.

94. The system according to claim 1, further comprising a reversible fluid providing passive protection for the system by defining a maximum and/or minimum elevation of the system.

95. The system according to claim 1, further comprising a scientific instrument, camera, cargo, or area for a passenger.

96. The system according to claim 1, further comprising a power generation device.

97. The system according to claim 1, further comprising a communications module.

98. The system according to claim 1, further comprising a data acquisition system configured to receive atmospheric data.

99. The system according to claim 98, further comprising a control system configured to control the system's altitude to access altitude-variable wind directions and speed for lateral mobility of the system.

100. The system according to claim 99, wherein the control system is configured to access the atmospheric data and coordinate lateral mobility according to stored algorithms.

101. A method of passive elevation control of a buoyant craft having a system including direct compression buoyancy control, the method comprising:
providing a substantially gas-tight envelope including a plurality of successive envelope segments in fluid communication with one another;
providing lifting gas contained within the substantially gas-tight envelope;
providing a tension cable connecting at least two of the envelope segments;
providing a buoyancy control device;
providing a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments;
providing a reversible fluid for the system, the reversible fluid having a phase characteristic based on an environment within which the buoyant craft is designed to maintain a passive elevation; and
the reversible fluid passively maintaining elevation of the buoyant craft in the environment due to the transition characteristics of the reversible fluid between a liquid and vapor phase.

102. The method according to claim 101, wherein the passively maintaining elevation of the buoyant craft is constrained to a maximum and/or minimum elevation within the atmosphere of the environment based on a temperature and pressure of the atmosphere of the environment compared to the transition characteristics of the reversible fluid between the liquid and vapor phase.

103. The method according to claim 102, wherein the environment is the atmosphere of Venus and the reversible fluid is selected based on a range of temperatures and atmospheric pressures of Venus at a predetermined range of maximum and/or minimum surface elevations.

104. The system according to claim 1, further comprising:
polar rings positioned external to the envelope at axial intervals of the envelope to define distensions and compression of the envelope.

105. The system according to claim 104, wherein the substantially gas-tight envelope is fabricated from a single sheet of gas-tight film that is rolled to form a substantially cylinder shape.

106. The system according to claim 105, wherein the substantially gas-tight envelope includes a single meridional seal and sealed polar extremities.

107. A method for manufacturing a system including direct compression buoyancy control, the method comprising:
providing a substantially gas-tight envelope including a plurality of successive envelope segments in fluid communication with one another, wherein the substantially gas-tight envelope is fabricated from a single rectangular sheet of gas-tight film that is rolled to form a substantially tubular shape;
providing polar rings positioned external to the envelope at axial intervals of the envelope to introduce distensions and compression of the envelope;
providing lifting gas contained within the substantially gas-tight envelope;
providing a tension cable connecting at least two of the envelope segments;
providing a buoyancy control device;
providing a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments;
sealing opposing lengths of the rectangular sheet to form a single meridional seal to create the tubular shaped envelope;
sealing the extremities of the tubular shaped envelope;
assembling the substantially gas-tight envelope with the polar rings positioned external to the envelope at axial intervals of the envelope;
assembling the substantially gas-tight envelope with the tension cable;
filling the substantially gas-tight envelope with the lifting gas; and
assembling the tension cable with the buoyancy control device to adjust the tension cable to alter compression of the lifting gas within the substantially gas-tight envelope to control the buoyancy of the system.

108. The method according to claim 107, further comprising:
assembling a plurality of tendons disposed meridionally along the lengths of the rectangular sheet and interior to the polar rings.

109. The method according to claim 108, wherein the sheet of gas-tight film is made of a substantially inextensible material.

110. The system according to claim 1, wherein the tension cable is positioned inside the envelope and connects opposing interior surfaces of at least two of the envelope segments in tension.

111. The system according to claim 110, the buoyancy control device configured to adjust a length of the tension cable between the at least two envelope segments to change a buoyant altitude of the system.

112. The system according to claim 110, the substantially gas-tight envelope being made of a substantially inextensible material.

113. The system according to claim 110, wherein the plurality of successive envelope segments is a column of segments capable of for an accordion-like collapse under axial compression.

114. The system according to claim 110, wherein one or more circumferential constriction members apply constriction to the gas-tight envelope to shape the successive envelope segments.

115. The system according to claim 110, wherein the gas-tight envelope includes a single sheet of gas-tight material with a meridional seal.

116. The system according to claim 110, further comprising an array of multiple tendons disposed meridionally along a height of the envelope.

117. The system according to claim 110, wherein the plurality of successive envelope segments includes a lifting gas aperture for lifting gas to flow from one envelope segment to an adjacent envelope segment by the lifting gas aperture.

118. The system according to claim 117, further comprising a connection interface connecting the one envelope segment to the adjacent envelope segment and including the lifting gas aperture.

119. The system according to claim 117, wherein the tension cable is positioned inside the envelope and a first end of the tension cable is attached to an internal apex of an envelope segment and extends through the tension cable aperture.

120. The system according to claim 113, further comprising a plurality of lifting gas apertures, the lifting gas apertures being larger than the tension cable aperture to permit rapid passage of lifting gas between adjacent envelope segments.

121. The system according to claim 113, further comprising a first inflexible compression member increasing a compression ratio of the gas-tight envelope to more efficiently collapse and compress the gas-tight envelope.

122. The system according to claim 121, further comprising a second inflexible compression member increasing a compression ratio of the gas-tight envelope, the tension cable internal to the envelope and connecting the first inflexible compression member to the second inflexible compression member.

123. The system according to claim 113, wherein the buoyancy control device includes a neutral buoyancy tension cable setting, a negative buoyancy tension cable setting, and a positive buoyancy tension cable setting.

124. The system according to claim 123, wherein the neutral, negative, and positive buoyancy settings include a tension cable load setting, relative pressure setting, and/or tension cable length setting.

125. The system according to claim 123, wherein the tension cable setting for neutral, negative, and positive buoyancy is associated with an elevation.

126. The system according to claim 125, wherein the system is configured to actively record the tension cable setting for neutral, negative, and positive buoyancy as the system ascends, descends, or maintains a buoyant position at the elevation.

127. The system according to claim 113, further comprising an obstruction mass, the obstruction mass creating an obstruction at a particular location of the gas-tight envelope to prevent or resist the particular location of the gas-tight envelope from collapsing.

128. The system according to claim 113, wherein the number of segments of the envelope are selected based on a desired altitude range of the system.

129. A method of manufacturing a system including direct compression buoyancy control, the method comprising:
manufacturing a substantially gas-tight envelope including a column of successive envelope segments in fluid communication with one another capable of accordion-like collapse under axial compression, wherein the number of segments of the envelope are selected based on a desired altitude range of the system;
providing lifting gas contained within the substantially gas-tight envelope;
providing a tension cable;
providing a buoyancy control device;
providing a tension cable aperture between adjacent segments of the envelope, the tension cable aperture being centrally located along a central axis of the envelope to provide alignment of the tension cable with the central axis of the envelope, enabling the tension cable to provide uniform compression and distension of the envelope segments;
selecting a motor having a torque;
assembling the envelope with the tension cable connecting at least two of the envelope segments, the tension cable positioned inside the envelope and connecting in tension opposing interior surfaces of at least two of the envelope segments;
assembling the buoyancy control device with the motor, the control device being configured to cause the motor to adjust the tension cable thereby altering compression of the lifting gas within the substantially gas-tight envelope to control the buoyancy of the system.

130. The system according to claim 113, the buoyancy control device capable of maintaining a controlled rate of elevation change by adjusting tension cable load.

131. The system according to claim 1, further comprising:
polar rings positioned external to the envelope at axial intervals of the envelope to define distensions and compression of the envelope; and
the buoyancy control device configured to reduce a length of the tension cable within the substantially gas-tight envelope thereby increasing compression of the lifting gas within the substantially gas-tight envelope and configured to subsequently increase the length of the tension cable within the substantially gas-tight envelope thereby decreasing compression of the lifting gas to control the buoyancy of the system.

132. The system according to claim 131, wherein the substantially gas-tight envelope is fabricated from a single sheet of gas-tight film that is rolled to form a substantially cylinder shape.

133. The system according to claim 132, the substantially gas-tight envelope including a single meridional seal and sealed polar extremities.

* * * * *